(12) United States Patent
Kurtz et al.

(10) Patent No.: US 6,871,487 B2
(45) Date of Patent: Mar. 29, 2005

(54) SYSTEM FOR DETECTING AND COMPENSATING FOR AERODYNAMIC INSTABILITIES IN TURBO-JET ENGINES

(75) Inventors: Anthony D. Kurtz, Ridgewood, NJ (US); John Chivers, Derby (GB); Alan Epstein, Lexington, MA (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 96 days.

(21) Appl. No.: 10/367,227

(22) Filed: Feb. 14, 2003

(65) Prior Publication Data

US 2004/0159103 A1 Aug. 19, 2004

(51) Int. Cl.[7] ................................................. F02C 9/54
(52) U.S. Cl. ...................... 60/39.281; 60/39.27; 60/795
(58) Field of Search ........................ 60/794, 803, 39.27, 60/39.281, 795; 415/26, 27

(56) References Cited

U.S. PATENT DOCUMENTS

| 3,963,367 A | 6/1976 | Stalker et al. |
| 4,137,710 A | 2/1979 | Preti et al. |
| 4,236,137 A | 11/1980 | Kurtz et al. |

(Continued)

FOREIGN PATENT DOCUMENTS

| GB | 2172052 | 9/1986 |
| GB | 2191606 | 12/1987 |
| GB | 2273316 | 6/1994 |

OTHER PUBLICATIONS

Chivers & Epstein, "Sensor Requirements for Active Gas Turbine Engine Control," May 2000.
Eveker, Gysling, Nett, Sharma, "Integrated Control of Rotating Stall and Surge in High–Speed Multi–Stage Compression Systems," 1997.
Day, Breuer, Escuret, Cherrett, Wilson, "Stall Inception and the Prospects for Active Control in Four High Speed Compressors," 1997.
Paduano, Greitzer, Epstein, "Active Stabilization of Axial Compressors with Circumferential Inlet Distortion," 1997.
Paduano, Greitzer, Epstein, "Compression System Stability and Active Control," 2001.
Freeman, Wilson, Day, Swinbanks, "Experiments in Active Control of Stall on an Aeroengine Gas Turbine," 1997.

*Primary Examiner*—Michael Koczo
(74) *Attorney, Agent, or Firm*—Plevy, Howard & Darcy PC

(57) ABSTRACT

The present invention relates to a system for detecting aerodynamic instabilities in a jet turbine engine having a pressure transducer mounted in the engine. The pressure transducer, welded to a circuit in signal communication with a controller, is adapted to send measured pressure readings from air in a combustion chamber to the controller. The controller, located in spaced apart relation from the engine, is adapted by software to detect pressure patterns from the pressure signals generated by the transducer that are indicative of a stall or surge. A series of fuel and air valves located with compression and combustion chambers of the engine are in signal communication with the controller. The controller in response to detecting pressure signals indicating a stall or surge is operative to signals in the valves to change the air flow, air angle, fuel flow or speed to reduce the possibility of a stall or surge.

8 Claims, 37 Drawing Sheets

U.S. PATENT DOCUMENTS

| | | |
|---|---|---|
| 4,449,360 A | 5/1984 | Evans |
| 4,505,150 A | 3/1985 | Seymour et al. |
| 4,507,915 A | 4/1985 | Evans |
| 4,519,240 A | 5/1985 | St. Jacques et al. |
| 4,545,198 A | 10/1985 | Yoshida |
| 4,622,808 A | 11/1986 | Kenison et al. |
| 4,722,180 A | 2/1988 | Lindler et al. |
| 4,768,338 A | 9/1988 | Lindler et al. |
| 5,051,918 A | 9/1991 | Parsons |
| 5,141,391 A | 8/1992 | Acton et al. |
| 5,286,671 A | 2/1994 | Kurtz et al. |
| 5,471,880 A | 12/1995 | Lang et al. |
| 5,541,857 A * | 7/1996 | Walter et al. .................. 415/26 |
| 5,557,917 A | 9/1996 | Jaw |
| 5,575,144 A | 11/1996 | Brough |
| 5,752,379 A | 5/1998 | Schafer et al. |
| 5,782,603 A | 7/1998 | O'Brien et al. |
| 5,915,917 A | 6/1999 | Eveker et al. |
| 5,955,771 A | 9/1999 | Kurtz et al. |
| 5,984,625 A | 11/1999 | Murray et al. |
| 6,164,902 A * | 12/2000 | Irwin et al. .................. 415/17 |
| 6,205,771 B1 * | 3/2001 | Rowe ...................... 60/39.27 |
| 6,438,484 B1 | 8/2002 | Andrew et al. |
| 6,438,960 B1 | 8/2002 | Jaw |
| 6,513,333 B2 * | 2/2003 | Sugitani ................... 60/39.27 |
| 2001/0045088 A1 | 11/2001 | Sugitani |
| 2002/0129607 A1 | 9/2002 | Prasad et al. |

\* cited by examiner

LOWEST ORDER

PLANAR WAVES    SURGE

SURGE
AXIALLY OSCILLATING FLOW

FREQUENCY ~ 3-10Hz

SYSTEM FOR DETECTING AND COMPENSATING FOR AERODYNAMIC INSTABILITIES IN TURBO-JET ENGINES

BACKGROUND OF THE INVENTION

1. Field of the Invention

The present invention relates to control of a compressor in a gas turbine engine and, more particularly, to control of a compressor by detecting and compensating for aerodynamic instabilities.

2. Description of the Related Art

With the introduction of the gas turbine engine, the speed and reliability of air travel has improved significantly. The gas turbine engine also known as a turbojet engine provides propulsion through the acceleration of a stream of air or gas which is expelled at a high velocity. The typical turbo-jet engine includes three basic functional elements a compressor for gathering and pressurizing the air, a combustor chamber for heating the already pressurized air and a turbine for translating the energy released from the pressurized and heated air into mechanical energy and thrust to propel the aircraft forward. While jet engine technology has advanced one of the safest and fastest growing markets for mass transportation, the technology still suffers from problems caused by rotational stall and surge caused by changes in the air flow rates through the compressor. Such problems can be magnified by environments where the speed of the engine and the air speed in which the engine operates are changed. While providing an optimum operating environment can reduce the occurrence of stall and surge, these same problems have arisen in gas turbine engines implemented in the power generation field where the engine are operated at generally constant speeds with a controlled air flow environment.

The problem is that stall and surge are more likely to occur when the engine is operated at or near its optimum operating speed. One solution to the stall and surge problem has been to implement a feedback and control system that uses measured pressure or pressure and temperature characteristics to detect when conditions relating to stall and surge are about to occur. The measured signals are processed by a control circuit that detects a stall or surge condition and adjust the engine operating parameters to eliminate the measured conditions indicative of a stall or surge in the engine. While such solutions have worked well in implementations relating to turbine engines relating to power systems, such solutions have been hampered in the use of such solutions for jet engines. One problem has been the installation of sensors to detect the air flow conditions. The operational environment of the turbine engine causes the sensors to be subjected to extreme temperatures and vibrational conditions. While the sensors in gas turbines for power generation and the like may be mounted in a way to isolate the sensor from such harsh conditions, the turbine engines used in jet aircraft have weight and aerodynamic considerations that make such techniques impractical. Compounding the problems in turbine engines for jet aircraft has been the advances made in the introduction of aluminum and composite materials into the jet engine design. Such materials help to incrementally increase efficiency and reduce weight; however, such materials have also increased vibration encountered in the engine. The result of these advances is the operating conditions in which the sensors must operate have become more severe.

Thus a need exists for a way to implement a surge detection system in a jet aircraft which improves the operational parameters of the engine without sacrificing the aero dynamic and weight considerations in the design.

SUMMARY OF THE INVENTION

The present invention relates to a system for detecting aerodynamic instabilities in a jet turbine engine having a pressure transducer mounted in the engine by welding. The pressure transducer, welded to a circuit in signal communication with a controller, is adapted to send measured pressure readings from air in a combustion chamber to the controller. The controller, located in spaced apart relation from the engine, is adapted by software to detect pressure patterns from the pressure signals generated by the transducer that are indicative of a stall or surge. A series of fuel and air valves located with compression and combustion chambers of the engine are in signal communication with the controller. The controller in response to detecting pressure signals indicating a stall or surge is operative to signals in the valves to change the air flow or speed to reduce the possibility of a stall or surge.

BRIEF DESCRIPTION OF THE DRAWINGS

Other objects and advantages of the invention will become apparent from the foregoing detailed description taken in connection with the accompanying drawings, in which.

DETAILED DESCRIPTION OF THE PREFERRED EMBODIMENT(S)

Figure 1:
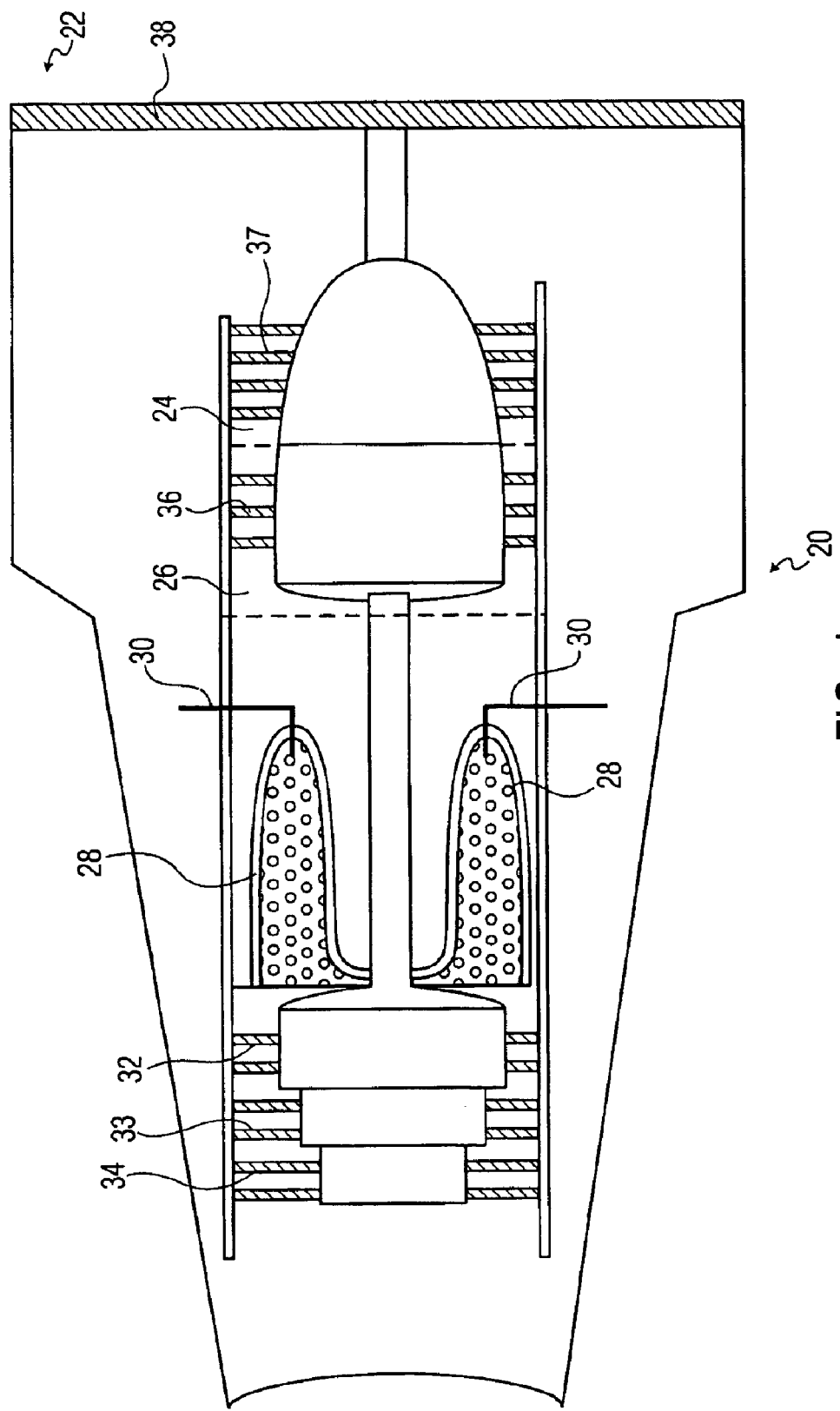
FIG. 1 is a partial, cut-away view of a turbofan jet engine.

With reference to the figures for purposes of illustration, the present invention is embodied in a jet engine 20 (FIG. 1). A typical jet engine design suitable for use in commercial aviation is two or three spool, turbo fan which generally includes a low pressure compressor 22 that collects air to improve thrust and feeds a portion of the collected air into an intermediate pressure compressor 24 or booster stages, in the case of a two spool design. Pressurized air from the intermediate (or Booster) pressure chamber 24 is subsequently fed to a high pressure chamber 26 which then feeds the highly pressurized air into the combustion chamber 28. As used throughout this description the term "intermediate chamber" may also refer to "booster chamber." The pressurized air is then mixed with fuel from fuel injectors 30 in the combustion chamber 28 and ignited. The pressurized and heated air is then fed into a turbine region defined by a series of turbine blades 32–34 that are rotated by the exiting air and as the air exits it results in thrust. With the turbines 32–34 connected on the shaft to respective compressor stages 36–38 in the front of the engine, the turbines rotated by the exiting air result in the rotation of the compressors. This basic jet engine design has been the principle form of propulsion used in most commercial aviation today. More recently through computer modeling and experimentation, it has been realized that dynamic instabilities in the air flow through the jet engine can lead to rotational stall and surge. Advantageously, the present invention incorporates high temperature, vibration compensated pressure transducers in the jet engine to measure air pressure in the booster/intermediate and/or the high compression chambers which then measures and communicates signals indicative of the measured pressure to a feedback and control circuit. It should be understood by those skilled in the art that there are a number of turbo fun engine designs with a variety of compression chamber designs. While a three stage chamber is used as the engine for this description, the vibration compensation solution disclosed herein is fit for use in a jet engine having any type of compression chamber configuration.

Figure 2:
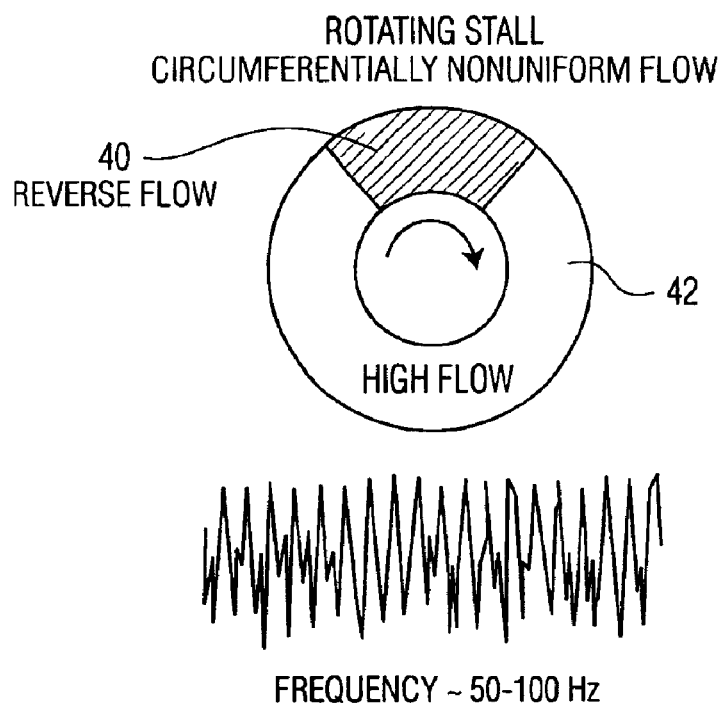
FIG. 2 is a diagram illustrating the effects of rotating stall.
Figure 3:
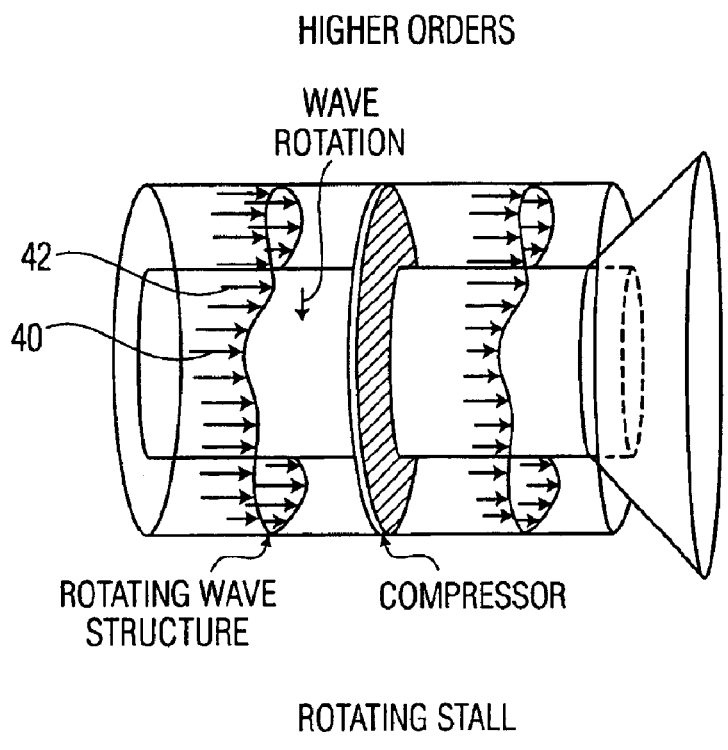
FIG. 3 is a diagram of air flow in a jet engine during a stall.
Figure 4:
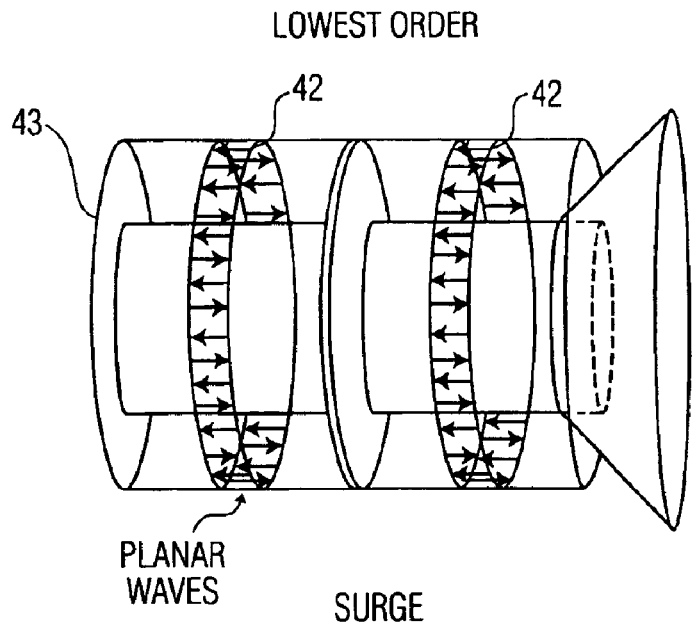
FIG. 4 is a diagram of air flow in a jet engine during a surge.
Figure 5:
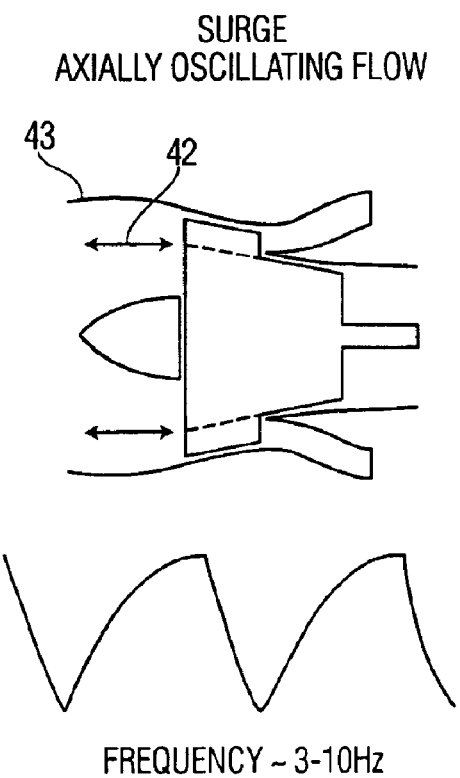
FIG. 5 is a diagram illustrating the effects of surge.

The occurrence of rotational stall can be brought on by a number of factors in including changes in the operational speed of the engine as well as wind and temperature changes in the surrounding air in which the engine is operating. With reference to FIGS. 2 and 3, rotating stall is when a portion 40 of the air 42 circulating about the circumference of the engine wall begins to experience a temporary back flow or reverse flow 40 in the direction of air passing through the compressor. While only a portion of the overall air is pushed back, this reverse flow begins to disrupt the flow of air in the compression chambers. In rotating stall, the reverse flow actual rotates about the circumference of the compression chamber and begins to oscillate at a rate of typically 50 to 100 Hz on large engines. As the effect becomes more pronounced rotating stall can lead to a surge (FIGS. 4 and 5), which is where the air flow 42 actually reverses completely resulting in a wave in which air back flows toward the front 43 of the engine. When stall occurs, the solution to overcome a stall condition is usually throttle back or to shut down and restart the engine.

Figure 6A:
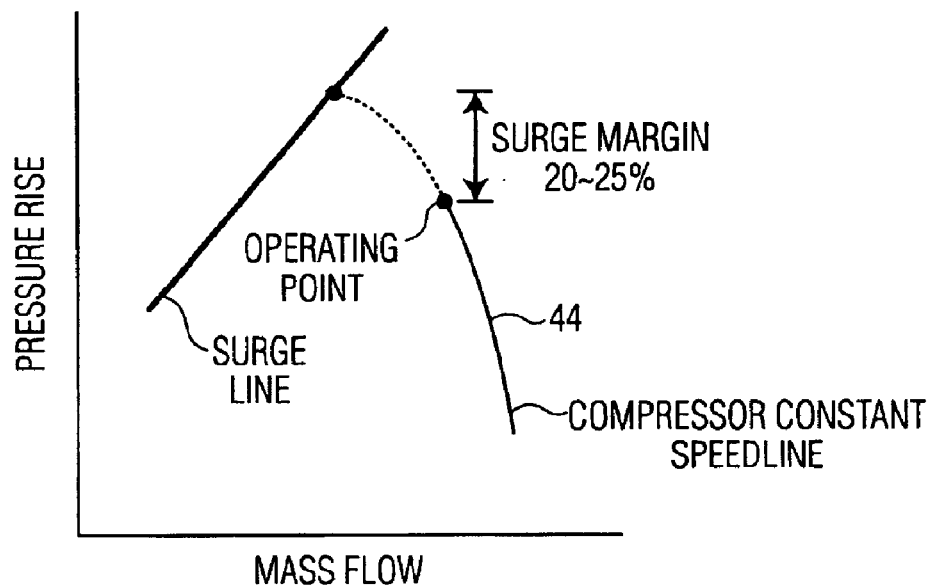
FIGS. 6A&B are graphs correlating speed to surge for uncompensated and compensated operation.
Figure 6B:
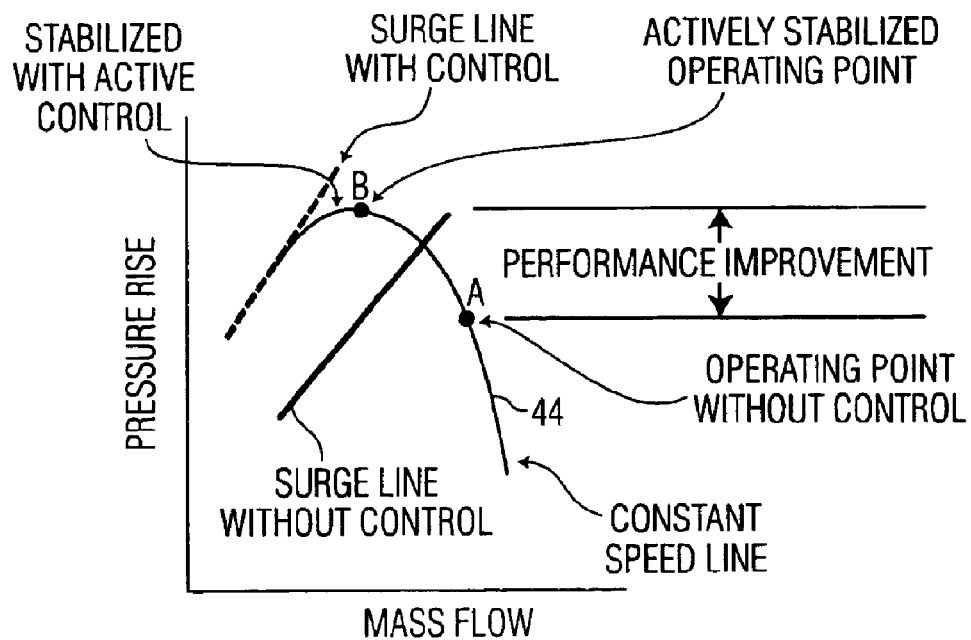

With reference to FIGS. 6A–B, stall and surge are related to the relationship of pressure rise and mass flow during varying operating speeds 44. Even with the highest degree of tolerances in the engine design the peak operating efficiency of an engine without control can be 20–25% below optimal efficiency. This is due to the occurrence of rotational stall and surge which may appear as the engine approaches its optimal operating conditions. In studies conducted on the ground, it has been shown that the occurrence of surge can actually be shifted through feedback and control systems to allow for an actively stabilized operating point at the optimal operating pressure rise and mass flow.

Figure 7:
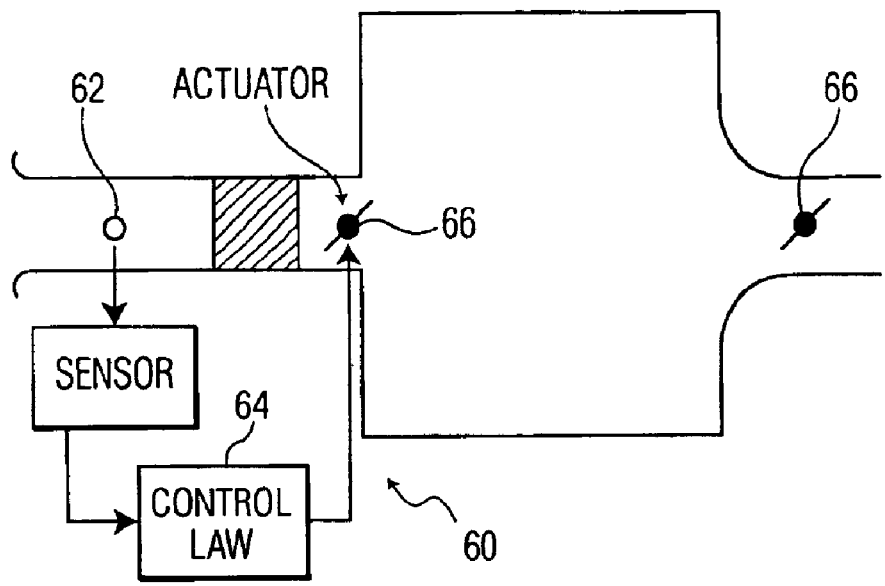
FIG. 7 is a block diagram of a jet engine fitted with a feed back and control logic diagram.

A sample feedback and control system 60 (FIG. 7) may include pressure sensors 62 located in or about the intermediate/booster or high pressure compressor which provides feedback to a control law device 64 such as a microprocessor located remotely from the high pressure and temperature operating conditions of the engine. The control law device 64 operates using known control law parameters to interpret the measured pressure signals and in turn operates the actuators 66 which may be valves to control either the air flow in the engine or fuel flow or motors to adjust the angle of stator vanes in anticipation of a stall or surge condition to adjust the operating conditions to eliminate such a possibility. Control law devices of the type suitable for this purpose may operate as separate processor devices or may be included in existing control logic devices adapted to monitor the engine performance. The software for performing the control law uses a conventional Fourier decomposition logic to detect air flow patterns measured from pressure transducers located in the intermediate/booster and/or high pressure compressors of the gas turbine engine. The software is not a simple unweighted FFT, but rather curve fitting logic that account for variations in under sampling and over sampling of the measured characteristics. Control Law formula of the type suitable for this purpose includes the control law logic outlined in "Compression System Stability and Active Control" (2001) by J. D. Paduano, E. M. Greitzer and A. H. Epstein which is incorporated herein by reference.

Figure 8:
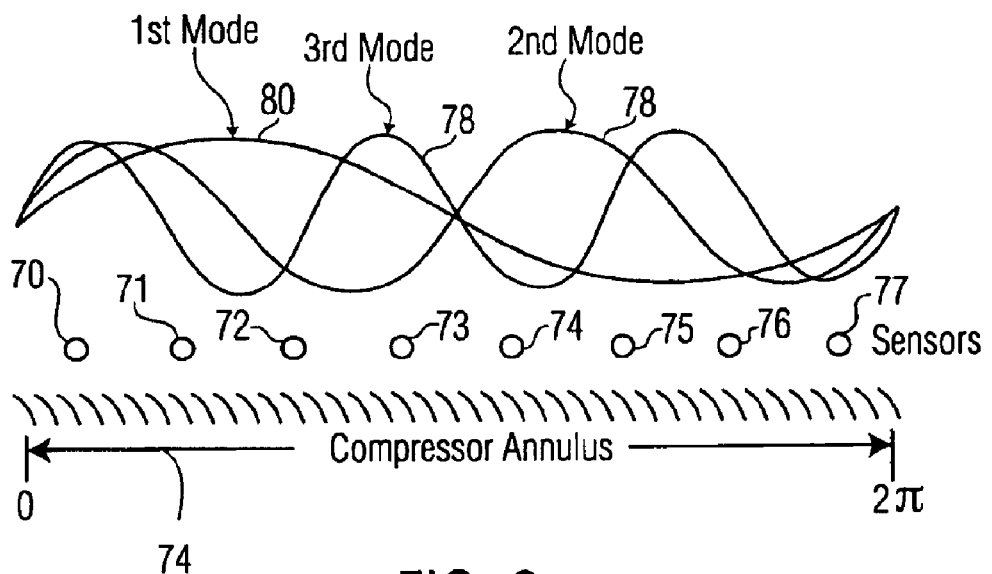
FIG. 8 is a block diagram illustrating the location of sensors in a compression chamber.

In acquiring the information needed for the control law device to accurately predict the occurrence of stall or surge, a plurality of pressure transducers 70–77 (FIG. 8) are placed about the circumference 74 of either the intermediate/booster or high pressure compression chamber. The number of pressure transducers 70–77 and placement of the pressure transducers needs to be sufficient to measure the waveform variations 78–80 in air flow brought on by the occurrence of rotational stall. When the transducers are placed in equal spaced apart relation it will be appreciated that the number of transducers needs to be sufficient to measure at least two points in the cycle of a rotational stall waveform 78, 79 or 80. It will be appreciated that the number of pressure transducers may be reduced by spacing the transducers at varying spaced apart points (not shown) about the circumference to ensure that varying frequencies are measured.

Figure 9:
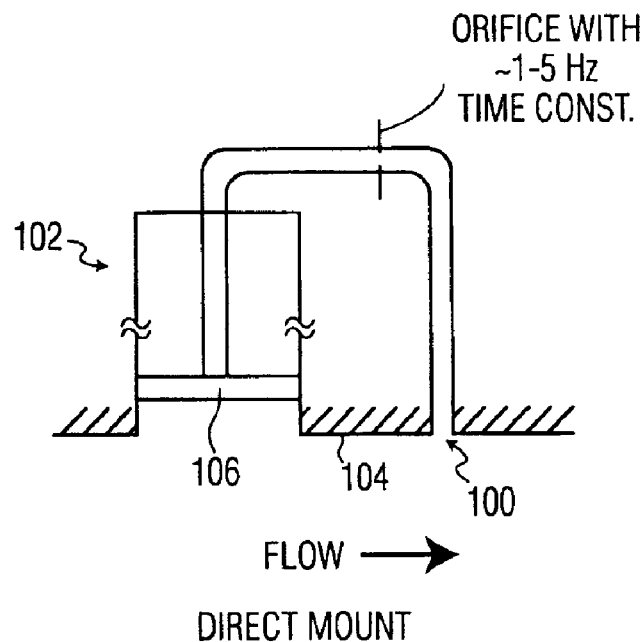
FIG. 9 is a block diagram of a direct mounted sensor.
Figure 10:
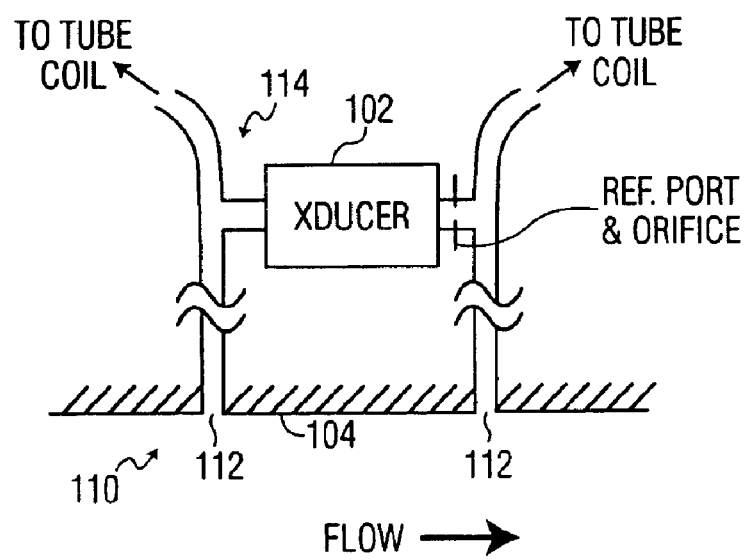
FIG. 10 is a block diagram of a semi-infinite sensor mounting.

The pressure transducers may be installed in various conventional installation configurations including, but not limited to:

1. Direct Mount 100 (FIG. 9) or Semi-Infinite Line Mount 110 (FIG. 10) generally referred to as a wall static installation with the pressure transducer 102 either directly mounted in the wall 104 of the compressor casing with a flush sensing diaphragm 106 or remote from the static tappings 112 using a non-resonate pipe system 114.

Figure 11:
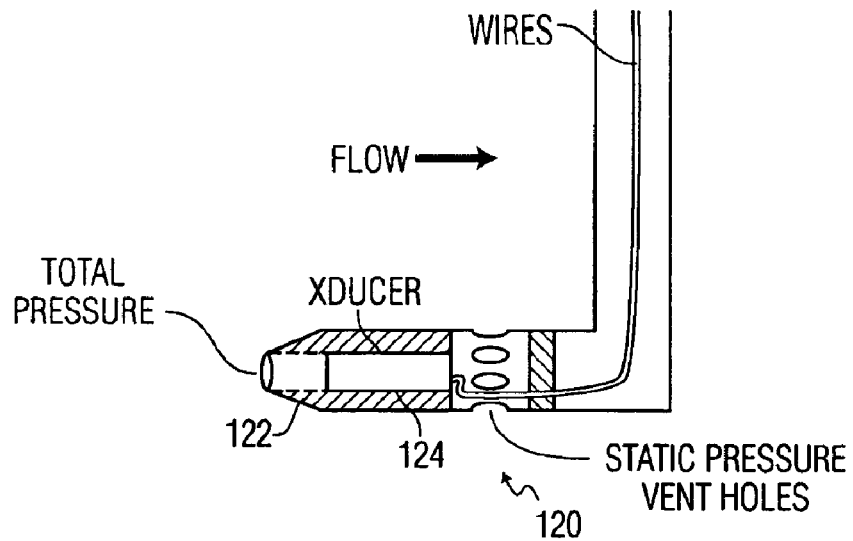
FIG. 11 is a block diagram of a pitot probe configuration.
Figure 12:
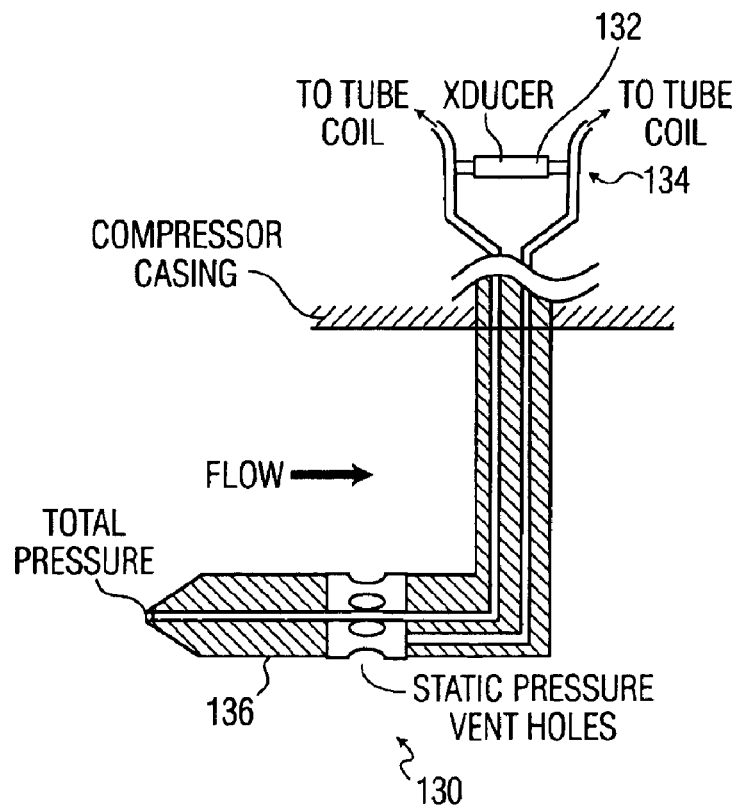
FIG. 12 is a block diagram of an alternate pitot probe configuration.

2. Embedded Transducer Mount 120 (FIG. 11) or Semi-Infinite Line Mount 130 (FIG. 12) generally referred to as a pitot probe 122 mounting in which the pressure transducer 124 is either mounted within a pitot probe to measure air pressure or the pressure transducer 132 is mounted remotely using a non-resonant pipe system 134 to draw air from the pitot probe 136.

It will be appreciated by those skilled in the art that the wall static installation is presently preferred as the pitot probe would introduce objects into the air flow of the engine and the consequences of such objects on the air flow have not yet been fully studied.

The use of such systems has been known to work in laboratories and in the fields of power generation where the attachment of pressure transducers can be isolated from the harsh environment of the combustion turbines. However, such implementations cannot be easily implemented in combustion turbines used for jet engines as the air dynamic properties of the gas turbine engine must be maintained internally and externally to the intermediate/booster and high pressure combustion chambers as the flow external from these chambers (by-pass airflow) is used to provide additional thrust to the aircraft.

The selection of the sensor type and location is a critical factor in determining the effectiveness and practicality of an engine surge and stall control system, as is the selection of the actuator type and the algorithms used to process the data from the sensors. A review of the most recently published material in the field of active control of surge and stall in axial flow compressors concludes that the most widely used physical parameter to monitor the stability of a compressor is pressure, although the measurement of gas flow using hot wire anemometers and the measurement of gas temperature using high response thermocouple probes have been used successfully.

The high response pressure data which is generated by the dynamic pressure transducer is processed using one of many proprietary algorithms in order to predict or detect the onset of stall and surge. Although the operation and logic of the algorithms described in the technical publications vary considerably, the data requirements from the pressure sensors appear to be remarkably similar.

The pertinent characteristics which are desired of a compressor mounted stall and surge pressure sensor are high sensitivity (ability to detect 70 Pa (0.01 psi) peak to peak fluctuations), stability of sensitivity with temperature and time (+5% to 10%FS) and the ability to survive in an extremely hostile environment (operating ambient temperatures and transients between −54° C. and 400° C. (−65° F. and 750° F.) and vibration levels of typically 30 g rms between 50 Hz and 18 kHz). The pressure transducer installation should also have sufficient bandwidth to measure frequencies between 100 Hz and 1 kHz for large gas turbines and between 500 Hz and 8 kHz for small gas turbines with negligible phase shift. During surge conditions, the pressure transducer must survive gas path pressure and temperature transients of up to 3.4 MPa (500 psi) and 1000° C. (1830° F.) for several seconds. Finally, if active surge and stall control systems are to be applied to production civil and military gas turbine engines in the future, the reliability and cost of the dynamic pressure transducers must be competitive with the pressure transducers currently used to measure oil, fuel, air and hydraulic pressures on airframes and engines.

In order to understand the development which has led to the creation of the leadless pressure transducer, it is relevant to consider the original silicon-on-insulator pressure capsule design.

Figure 13:
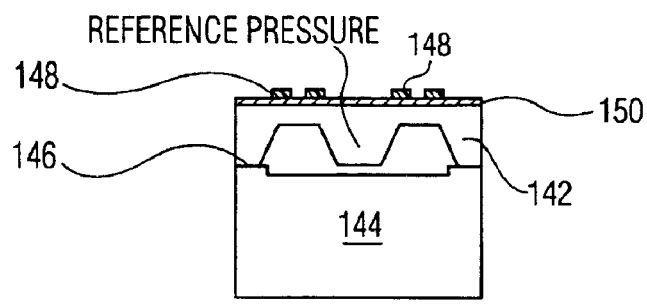
FIG. 13 is a diagram of silicon based pressure transducer.

The heart of the piezoresistive SOI pressure sensor 140 (FIG. 13) is a silicon diaphragm 142 which is supported upon a Pyrex glass pedestal 144 in such a manner as to enable a pressure differential to be applied across the diaphragm without introducing a mounting strain in the diaphragm. An "anodic" molecular bond 146 is used to attach the silicon diaphragm to the glass pedestal which ensures a very stable, permanent assembly without the use of glues or adhesives. Piezoresistive silicon strain gauges 148 are integrated within the silicon diaphragm structure, but are electrically isolated by a $SO_2$ barrier 150 from the silicon diaphragm 142. The piezoresistors 148 measure the stress in the silicon diaphragm 142 which is a direct function of the pressure of the media. The silicon diaphragm 142 is usually thinned in selected areas underneath the piezoresistors by anisotropic chemical etching in order to increase the pressure sensitivity of the diaphragm.

In a conventional arrangement, the piezoresistors are connected electrically via metallic interconnections to form a fully active Wheatstone bridge. At the corners of the diaphragm are placed five gold bond wires (not shown) which are ultrasonically ball bonded to the diaphragm metallization and are used to connected electronically to the bridge. Under extreme conditions to temperature and vibration, the ultrasonic agitation used to form the ball bonds causes abrasion to take place during the welding process and allows microscopic holes to develop in the platinum metallization through which, at high temperatures, the gold can migrate and form a gold-silicon eutectic which causes the leads to fail. In addition, the pressure media is in direct contact with the stress-sensing network, readouts and interconnects which at high temperatures and in the presence of aggressive chemicals can fail. The key elements in the design of a ruggedized pressure sensor is the elimination of the gold bond wires and the protection of the sensing elements from corrosive environments at thigh temperatures, hence the reference to the new sensor capsule as the "leadless" design.

The leadless sensor capsule 152 (FIG. 14) is comprised of two main components, the sensor chip 154 and the cover wafer 156 which are eventually assembled to form the pressure capsule.

The sensor chip is manufactured from two separate wafers. First a carrier wafer is fabricated which forms the mechanical structure, the diaphragm. The second wafer is referred to as the sacrificial wafer on which is defined the areas which the high conductivity $P^+$ piezoresistive strain gauges occupy. After oxidizing the carrier wafer to form an electrically insulating layer over its surface, the two wafers are bonded together using a Diffusion Enhanced Fusion bonding (DEF) process. The bond is a direct chemical molecular bond between the piezoresistive $P^+$ regions and the silicon oxide and uses no adhesive or additional components. Once the bond is formed, the non-doped areas of the carrier wafer are selectively removed chemically. The piezoresistive $P^+$ regions are now permanently bonded to the dielectrically isolated carrier wafer in which the diaphragm is now micromachined. In order to optimise the mechanical performance of the force collector, the diaphragm is formed in the shape of a picture frame.

Figure 15:
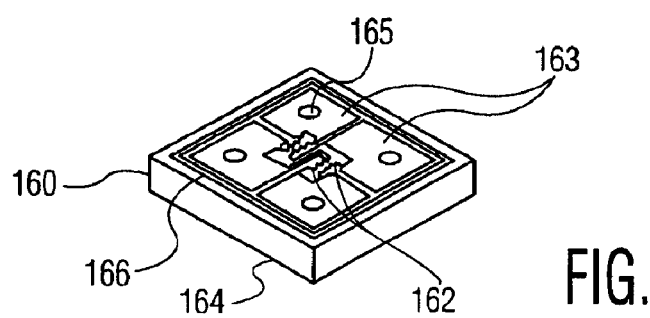
FIG. 15 is a diagram of a pressure transducer.

FIG. 15 shows a view of the sensor chip 160 with the four piezoresistive gauges 162 strategically positioned inside the "picture frame" shaped diaphragm 164 and connected in a Wheatstone bridge circuit. The entire sensing network is $P^+$ and there are separations between the contact regions of the bridge, Metal is deposited to form ohmic contacts to the $P^+$ regions located inside the large contact regions. There is also a rim of P+material 166 around the periphery of the sensor chip. When the cover wafer is assembled to the sensor chip, and hermetic seal is formed between the cover and this area of $P^+$ material thus protecting the stress sensing network and all the electrical interconnections from the harsh environmental conditions.

The cover wafer maybe manufactured from either silicon or a Pyrex glass to the same dimensions as the silicon wafer. Four holes are drilled in the cover, one in each corner, which align with the metallised contact pad areas. A recess is also created in the centre of the cover wafer to allow the diaphragm to deflect freely when assembled.

Figure 14:
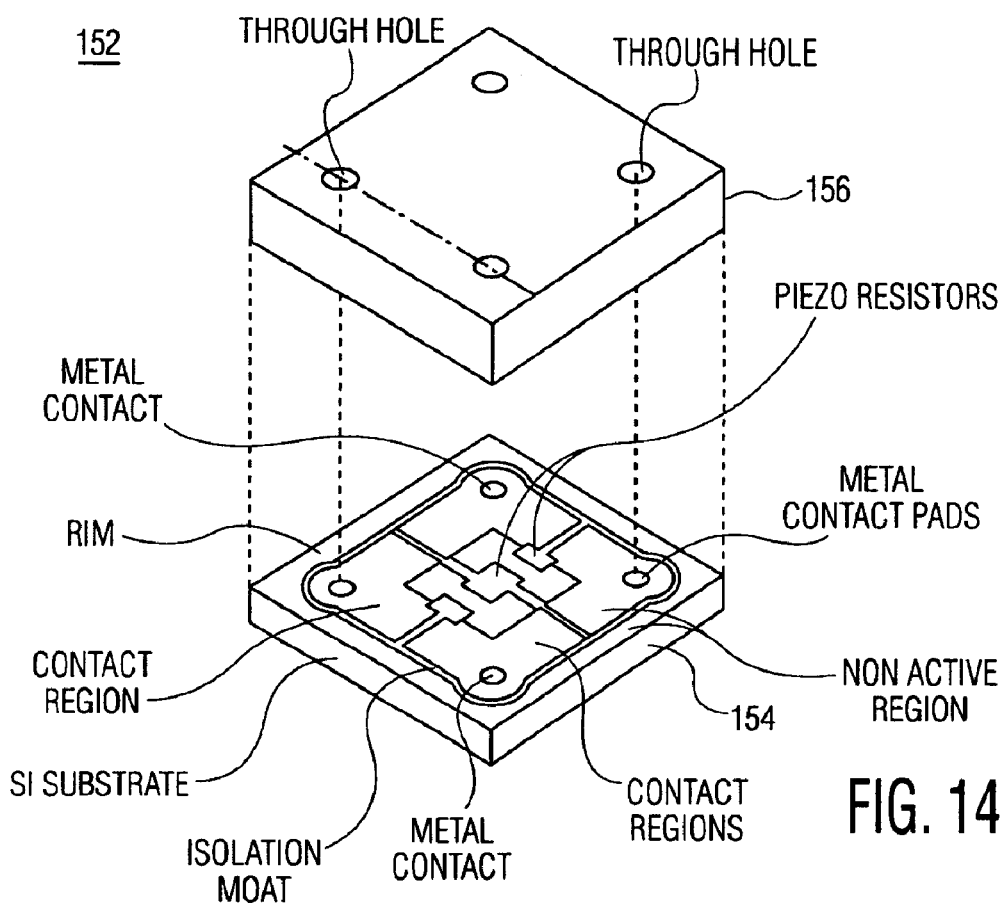
FIG. 14 is an isometric top view of two wafers aligned for bonding.

The sensor chip and the cover wafer are then assembled using an electrostatic bond. FIG. 14 shows a top isometric view of the components just prior to sealing. Once the two wafers have been bonded, only the metallised readout pads are exposed whilst all the gauges and electrical interconnections on the sensing side of the silicon chip are sealed by the cover. Thus the active portion of the pressure sensor is hermetically isolated.

To avoid the use of gold ball bonds and fine gold wires, a high temperature metal frit is used to provide the electrical connection between the sensing chip and a specially designed header. The frit is a mixture of high conductivity metal powders in appropriate physical form and glass and is used to fill the holes in the cover wafer after it is bonded to the sensor chip.

Figure 16A:
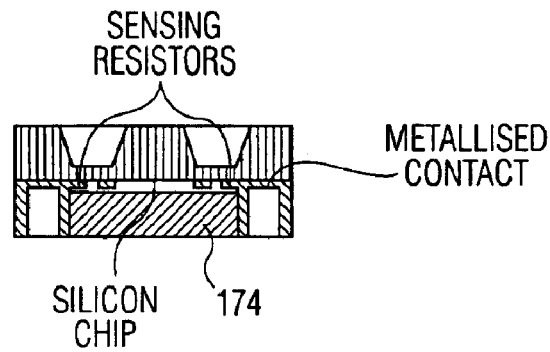
FIGS. 16A & B are diagrams of an assembled pressure capsule.
Figure 16B:
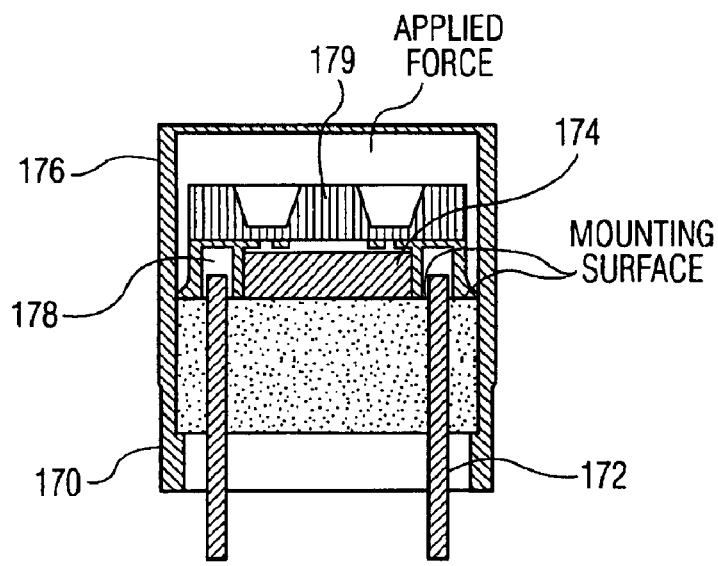
Figure 17:
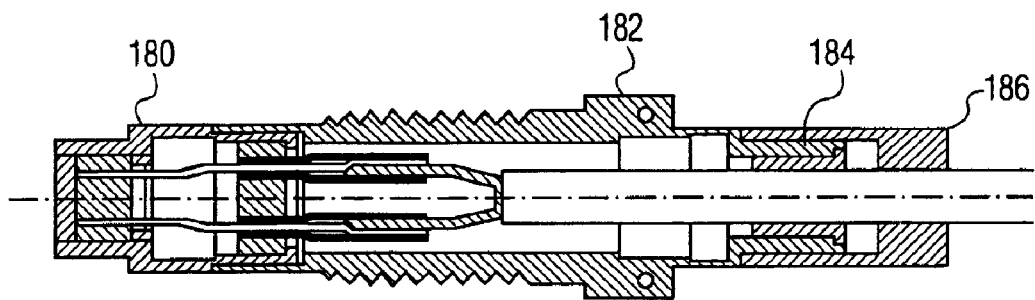
FIG. 17 is a diagram of an ultrahigh temperature leadless pressure transducer.

The specially designed header 170 contains a group of four hermetically sealed pins 172 protruding from its surface which are spaced so as to fit the holes drilled in the cover wafer. FIGS. 16A and B show a section of the assembled pressure capsule 176 and also a section of the pressure capsule 176 mounted in the header 170. The pressure capsule 176 is bonded to the header at a high temperature using a non conductive glass frit 178, during which process the metal frit 178 in the cover wafer holes melts and creates low resistance electrical connections between the header pins and the metal contact pads on the sensor chip 179.

After this firing process, only the non-active side of the diaphragm is exposed to the pressure medium. The small ball bonded gold leads have been eliminated and the entire sensor network and contact areas are hermetically sealed from the environment and the pressure media.

Figure 18:
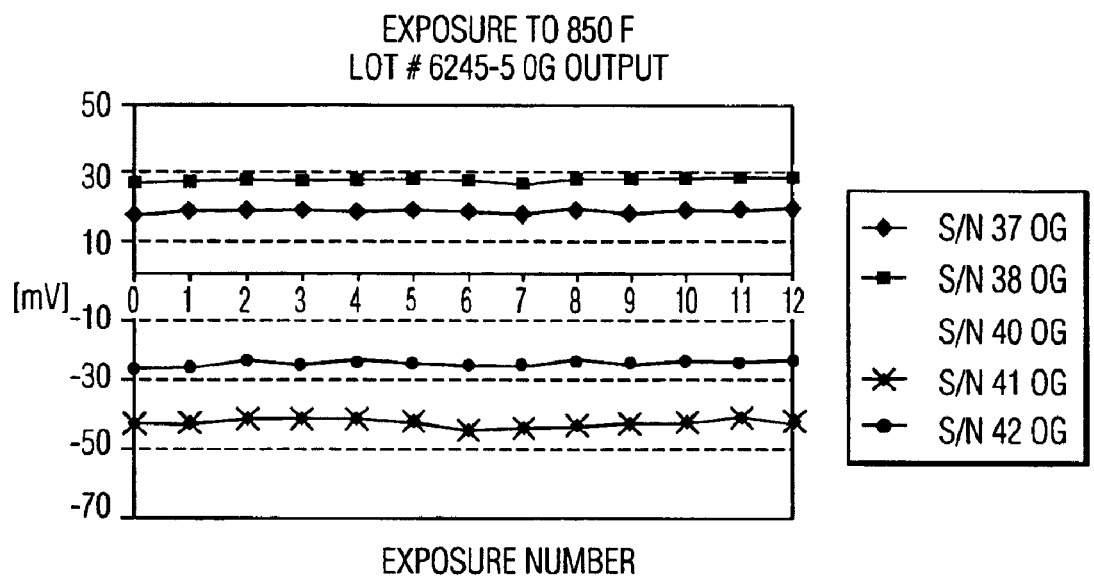
FIG. 18 is a graph of zero output during temperature cycling.

The hermetically sealed pressure sensing capsule bonded to the header is the starting point for the assembly into a pressure transducer. Typically most transducers must be attached to a mounting surface which is exposed to the pressure media, frequently by means of a threaded port. In addition, the header pins must be electrically connected to a high temperature cable assembly without the use of solder joints which may fail at high temperatures. The high temperature cable assembly must also contain material which will provide electrical insulation between individual leads, whilst the interconnects between the header and the cable as well as the cable itself must be strong enough to withstand the mechanical stresses of handling. The package is completed using a building block approach and FIG. 18 shows the assembly of a ultra high temperature leadless pressure transducer 180.

A sleeve 182 is welded between the first header and a second header. A minerally insulated (MI) cable containing nickel wires is used to interconnect to the pins from the first header and the exposed leads from the first header are welded to the second header to ensure low resistance electrical connections between the leads of the MI cable and the header leads.

The header/MI cable assembly is then inserted into a port 184 and welded to the port. At the end of the port is a tubulation 186 which is crimped to retain the MI cable.

A cover sleeve (not shown) is then assembled over the MI cable to give additional support and is welded to the rear of the cover which in turn is welded to the port 184.

This design of assembly results in the transducer being totally hermetically sealed from any atmospheric contamination or oxidation. Every single internal metallised surface such as metal to silicon and metal to glass frit, header pins to header tubes, header pins to MI cable wires and even the mineral insulation itself is hermetically sealed from the atmosphere. In addition the welding of the sleeve to the port together with the addition of the third header greatly increases the structural integrity of the entire electrical interconnect system and reduces the chances of any damage in severe environments.

Figure 19:
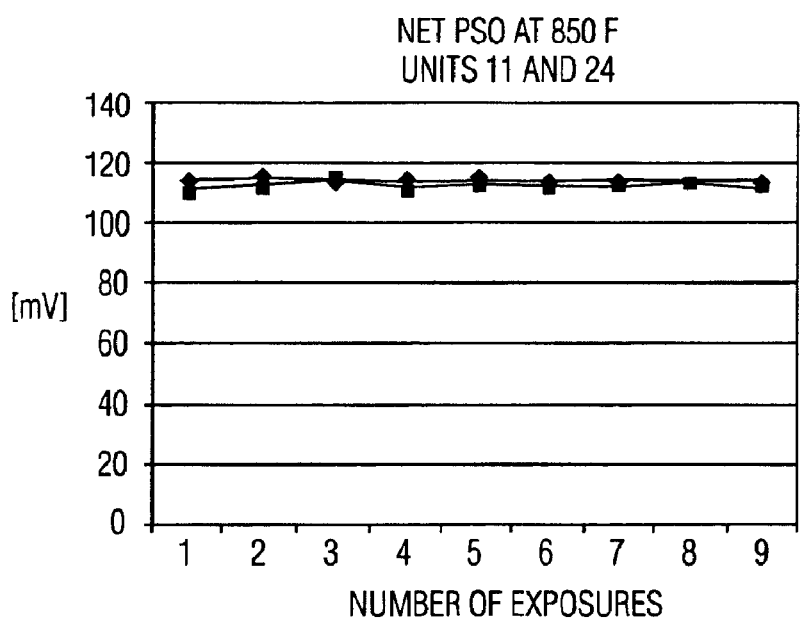
FIG. 19 is a graph of full scale output over repeated cycles.

The first generation of leadless transducers manufactured (five devices) have been tested in the laboratory with the following results. FIG. 18 shows the change in zero output during repeated temperature cycling between room temperature and 455° C. (850° F.). This demonstrates that exposure to high temperatures has negligible effect on the internal electrical connections and contacts. A few ohms change in a contact resistance would result in changes in the output of many millivolts. All observed changes in output were less than 2 mV. FIG. 19 plots the full scale output at 455° C. (850° F.) for two sensors over repeated cycles. Stable and repeatable outputs were observed throughout this study.

Figure 20:
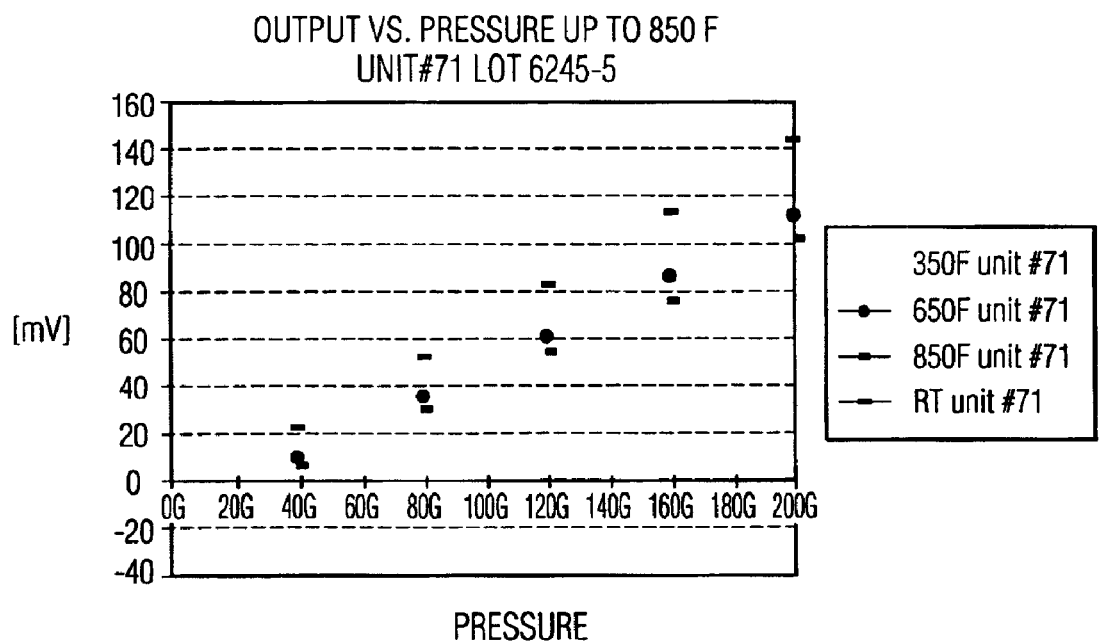
FIG. 20 is a graph of pressure v. output voltage at various temperatures.
Figure 21:
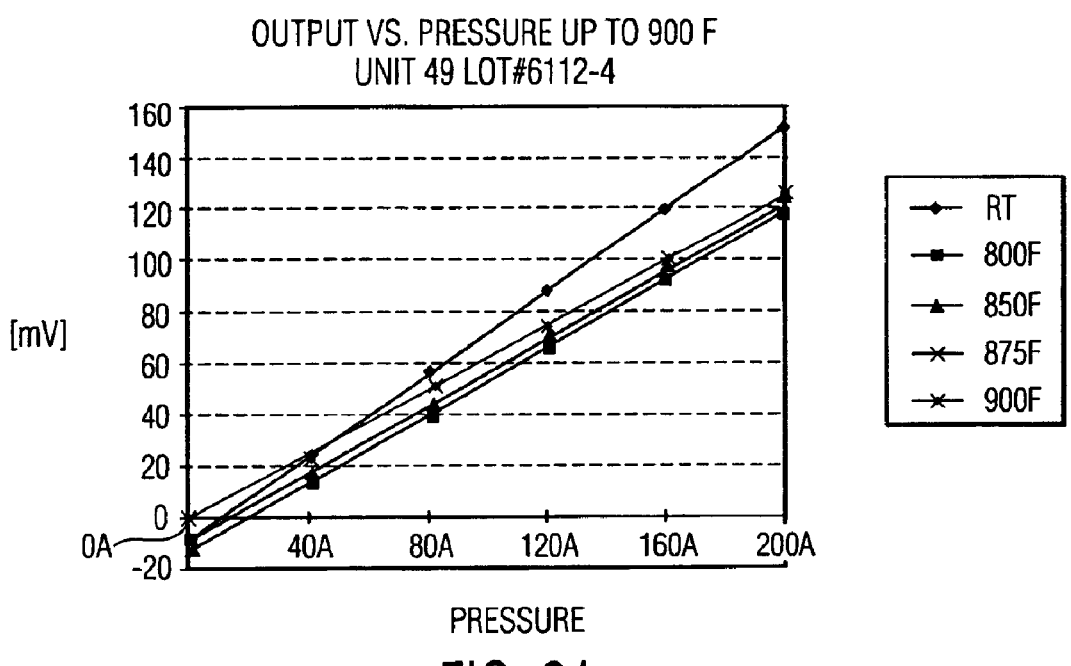
FIG. 21 is a graph of sensor performance up to 900° F.

FIG. 20 shows the pressure v output voltage performance measured at room temperature, 177° C. (350° F.), 343° C. (650° F.) and 455° C. (850° F.) for one of the sensors. There is a small element of zero shift but the unit is very linear and exhibits a repeatable span shift of approximately 2–3%/100° C. (1–2%/100° F.). FIG. 21 shows sensor performance up to 482° C. (900° F.) for another one of the tested sensors. Linearity and span shift remain virtually identical.

In summary, the devices appear to have less than 0.02% F.S. non-linearity and no measurable hysteresis up to temperatures of 343° C. (650° F.). At temperatures of 454° C. (850° F.) the non-linearity increases to around 0.1% F.S. but a static error band of better than 0.15% F.S. can be expected. All units tested exhibited only minor changes in performance characteristics after repeated exposure to high temperatures. When the units were compensated, span and zero shifts of less than 1% F.S. over the temperature range from room temperature to 400° C. (750° F.) were achieved.

Figure 22:
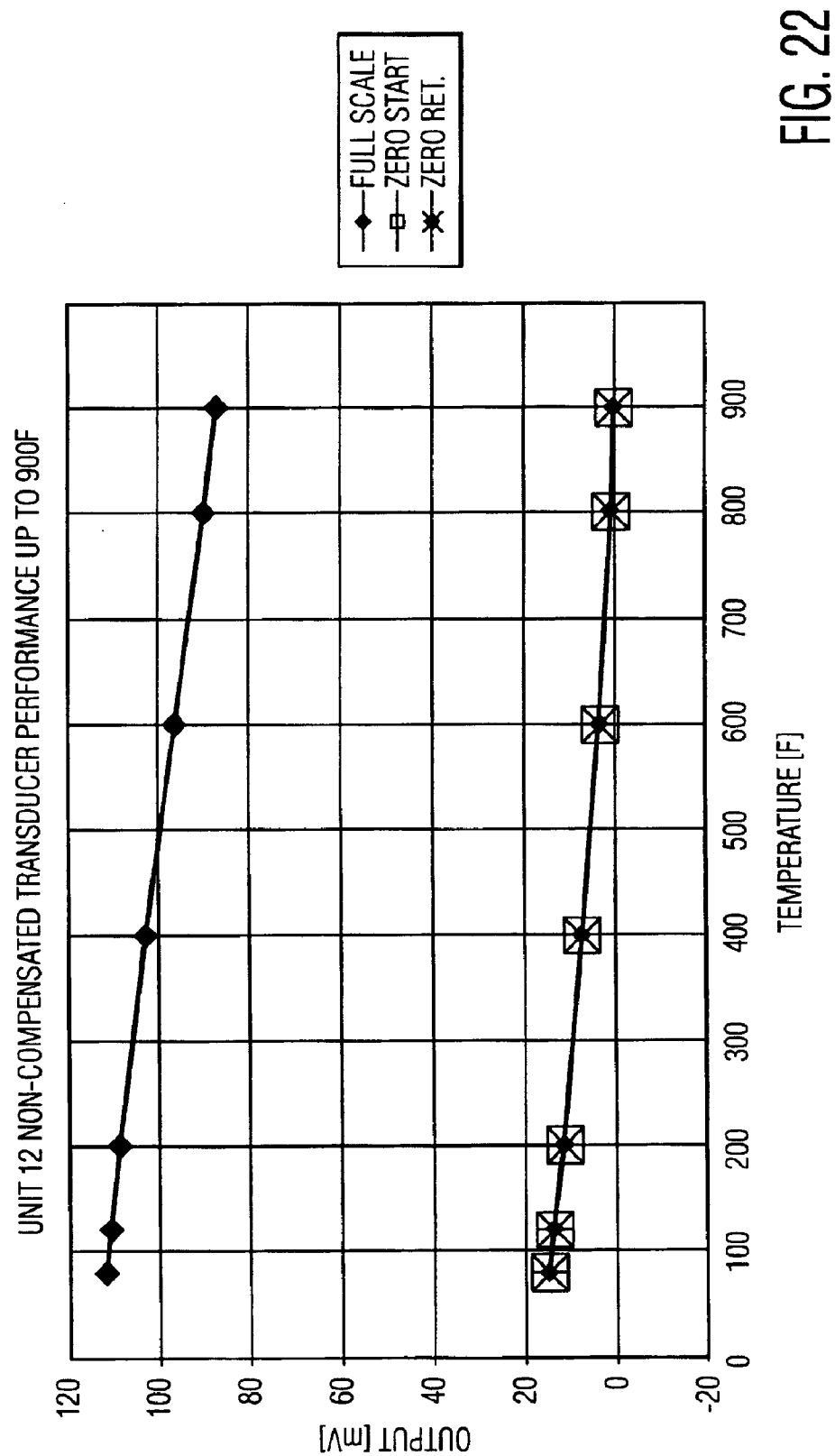
FIGS. 22–24 are graphs of zero to full scale output.
Figure 23:
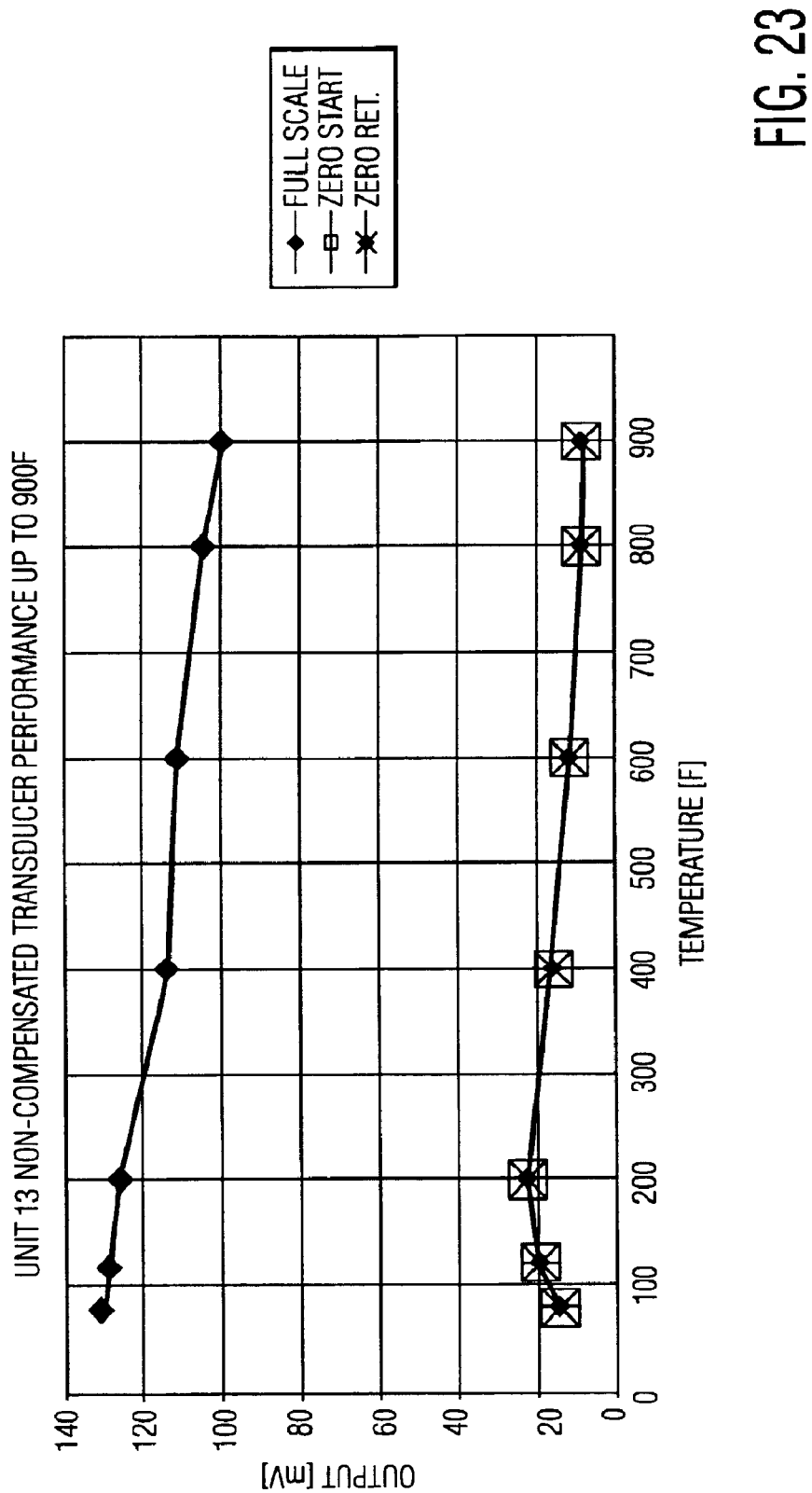
Figure 24:
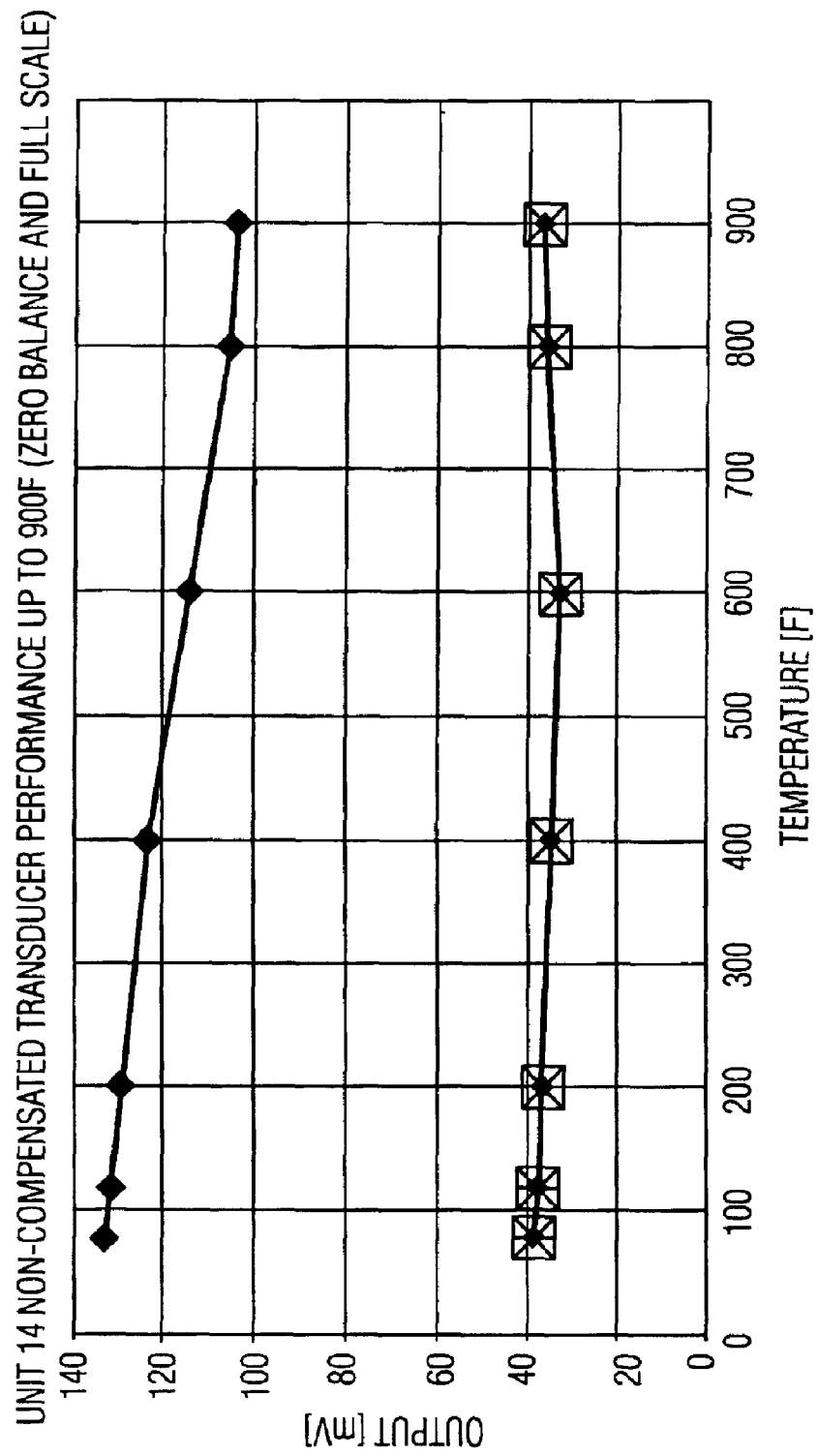

The latest generation of leadless transducers manufactured has been tested in the laboratory with the following results. FIGS. 22, 23, and 24 show the full scale output and zero output performance measured at room temperature, 200° F., 400° F., 600° C., 800° F. to 900° F. (480° C.) for three of the non-compensated sensors. There is a small element of zero shift with temperature but the units all exhibit a repeatable span shift of approximately (2.5%/100° F.) over the entire temperature range up to 900° F. Zero output shift with temperature and span shift remain virtually identical for all three tested sensors.

Figure 25:
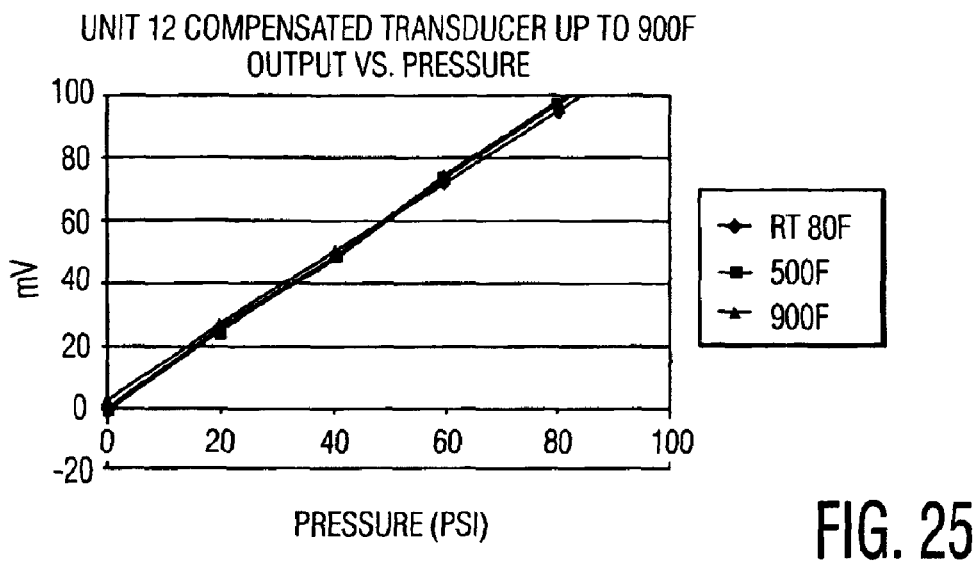
FIGS. 25–27 are graphs of output vs. pressure performance.
Figure 26:
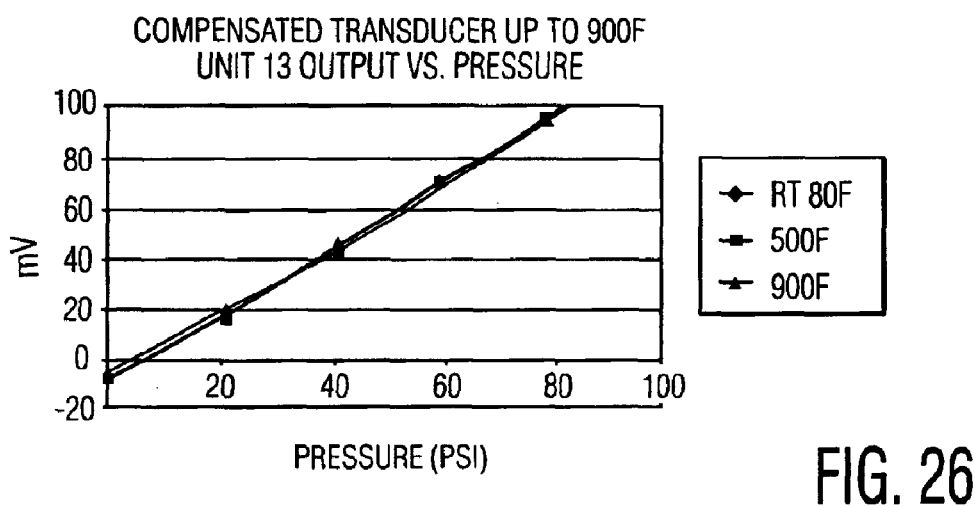
Figure 27:
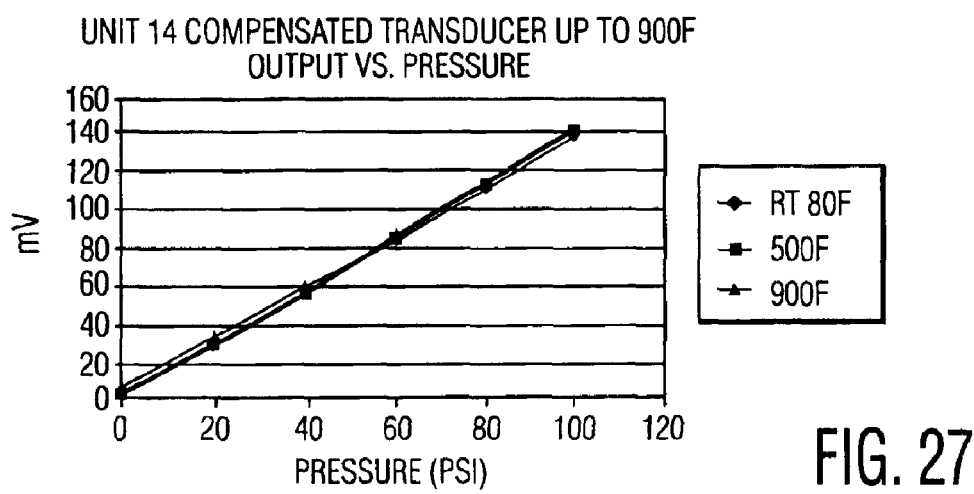
Figure 28:
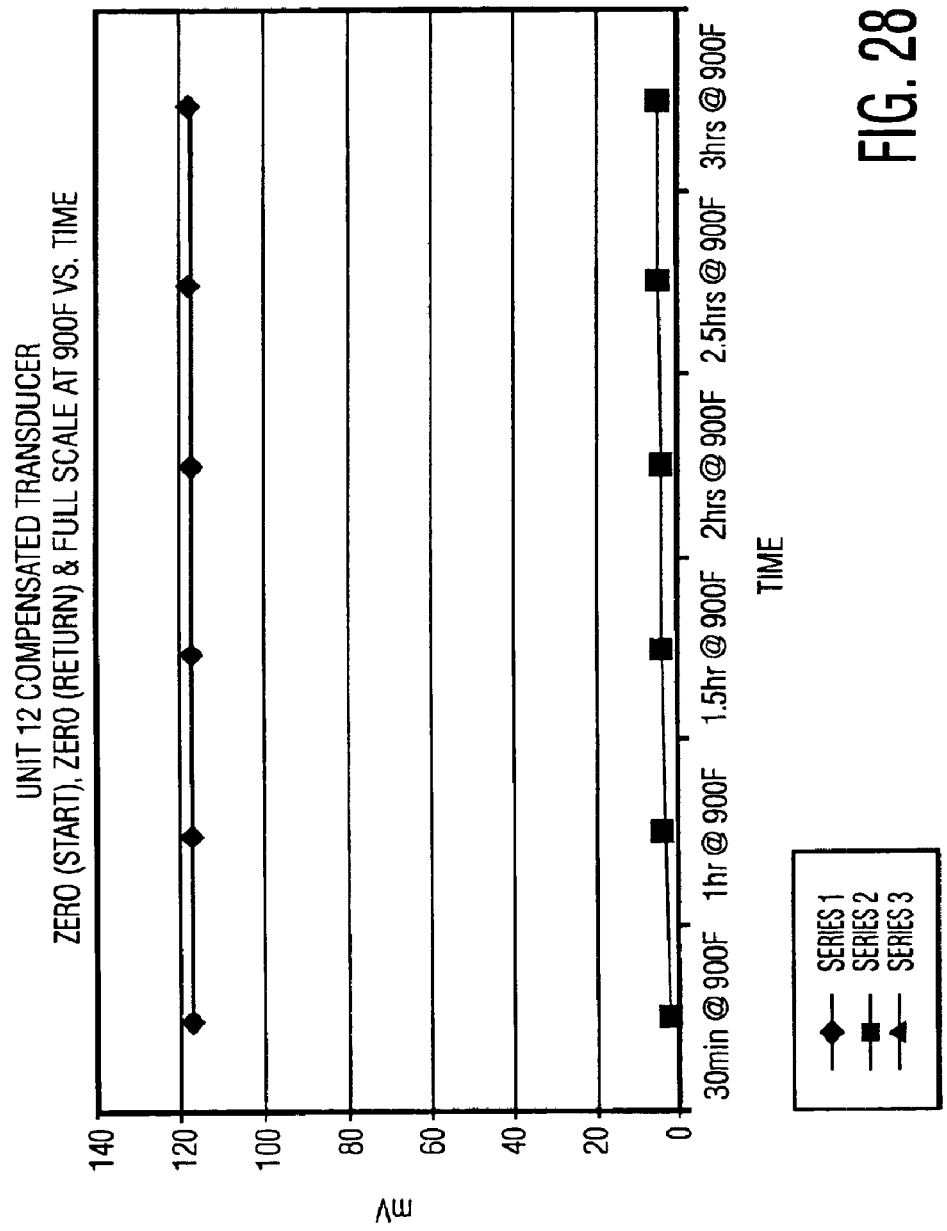
FIGS. 28–30 are graphs of the changes in zero output and full scale output.
Figure 29:
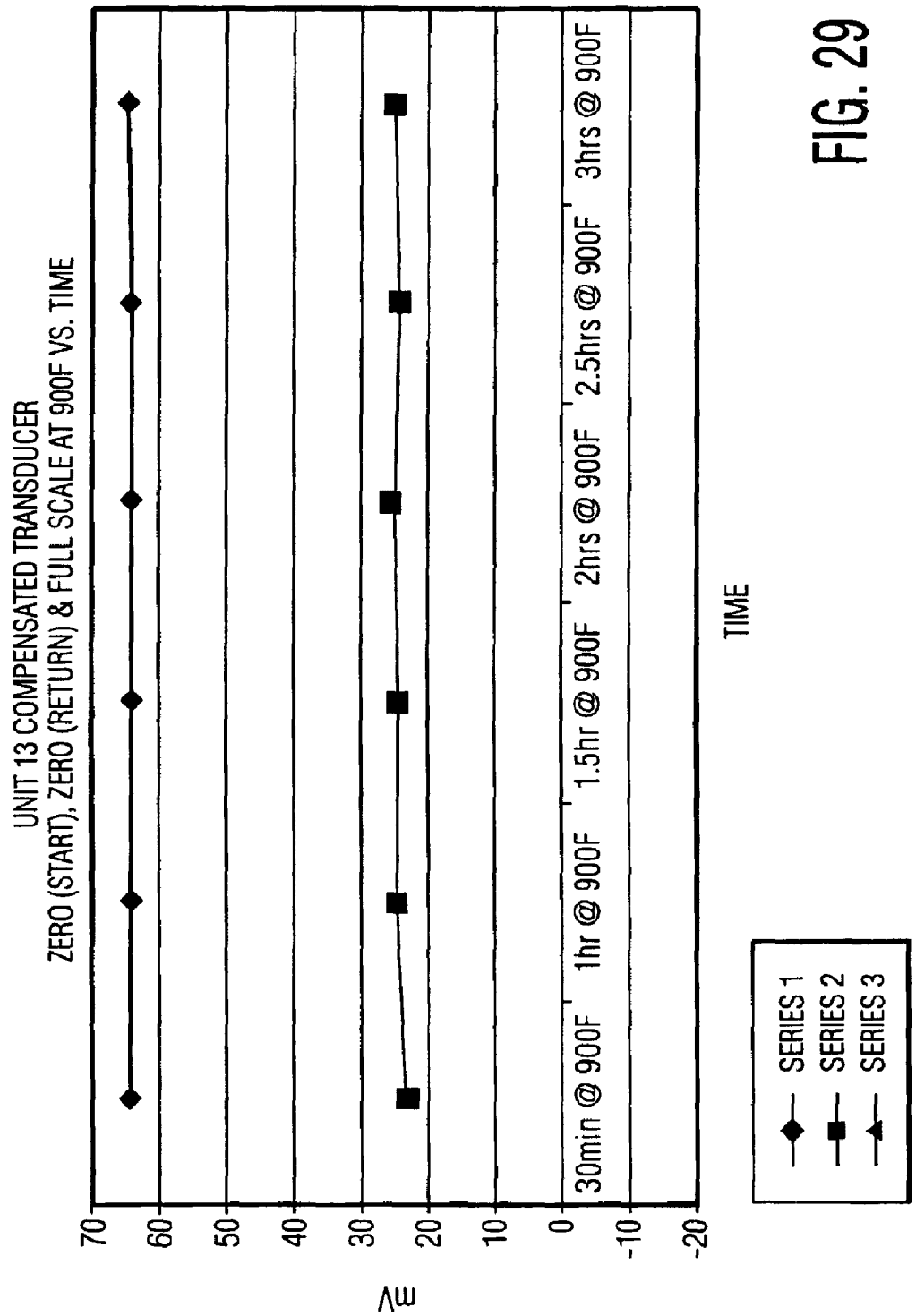
Figure 30:
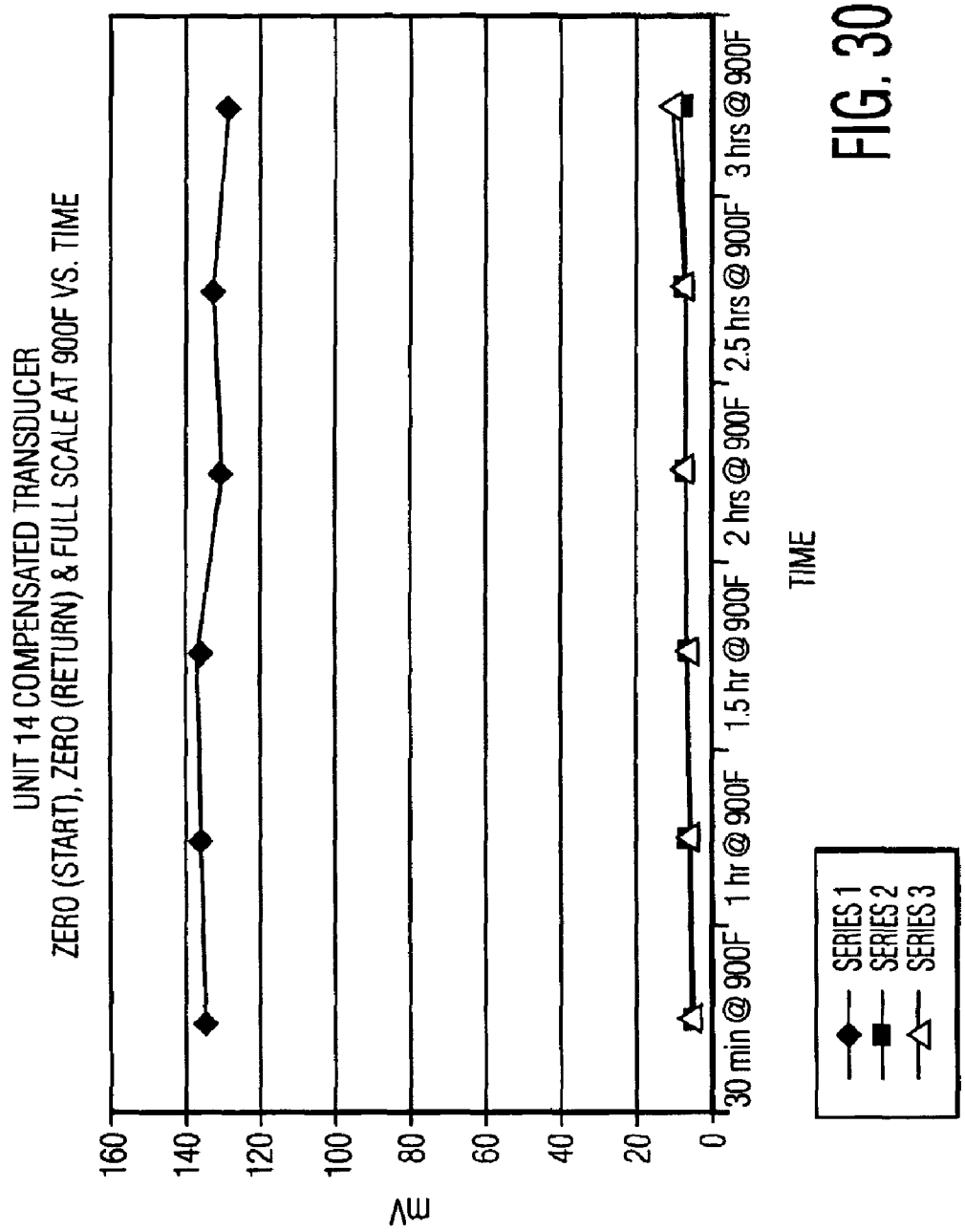

FIGS. 25, 26, and 27 show output vs. pressure performance for two compensated transducers. To summarize the test results, the devices appear to have less than 0.02% F.S. non-linearity and no measurable hysteresis up to 900° F. Units tested exhibited only minor changes in output vs. pressure performance characteristics over the temperature range. FIGS. 28, 29 and 30 show the change in zero output and full scale output for three compensated transducers during repeated temperature exposure to 900° F. (480° C.). This demonstrates that exposure to high temperatures has negligible effect on the internal electrical connections and contacts. A few ohms change in a contact resistance would result in changes in the output of many millivots. All observed changes in output were less than a few mV. These compensated units were exposed to 900° F. for over 3 hours without any noticeable degradation in performance. In summary, the span ad zero shifts of less than 1% F.S. over the temperature range from room temperature to 900° F. (480° C.) were achieved.

The design of the high temperature sensor is such that it should have high frequency response characteristics similar to those of more familiar, low temperature capability Kulite sensors. To very this experimentally, a pulsed air apparatus was set up in an oven.

Figure 31:
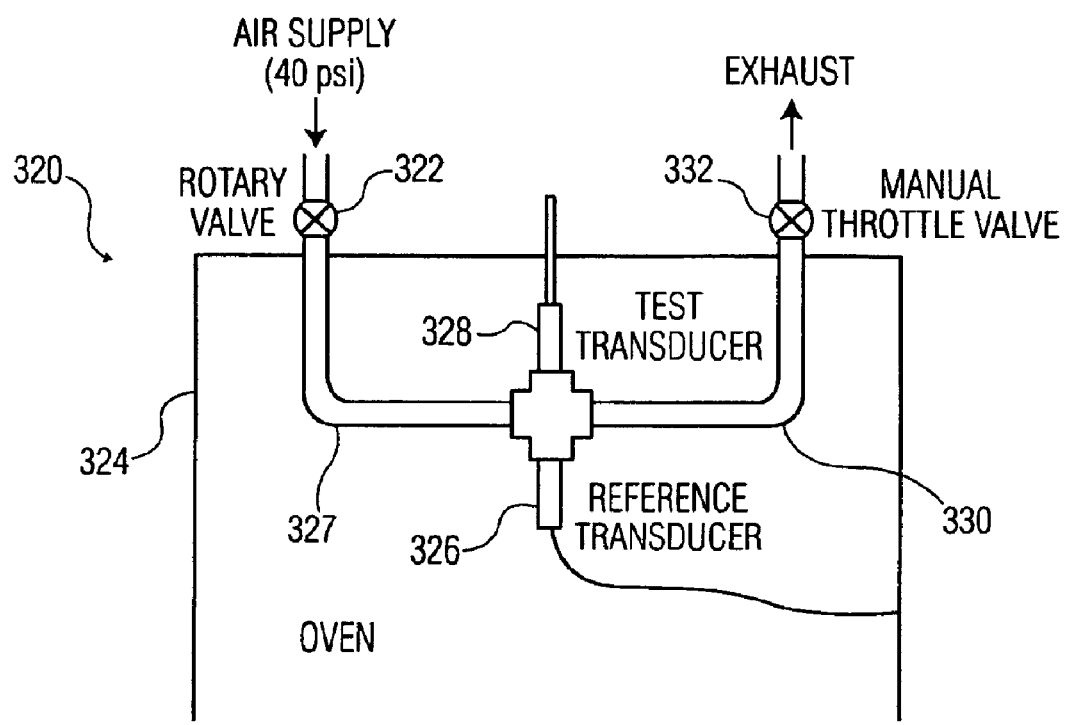
FIG. 31 is a diagram of a frequency response test set-up.

The frequency response test set up 320 is shown in FIG. 31. Large scale pressure primary pulsation at frequencies up to 400–500 Hz were generated by a water cooled, motor driven rotary valve 322 with an ¼" port. The valve was mounted immediately exterior to an oven 324 containing the test transducer 326. About 15 cm of ¼" stainless steel line 327 connects the valve to the transducer 326, which is mounted on one leg of a T off the line. A second, standard, lower temperature capability transducer 328 (Kulite model XTC-190) is mounted in the opposite leg of the T. After passing by the transducers, the flow exits the over through 15 cm of the line 330 to a manual throttle valve 332.

The response of both transducers was first established at room temperature. The high temperature unit and low temperature reference unit had essentially identical waveform shape and frequency response. This verifies that the transducer response is as expected. The reference unit was then removed and the test repeated at elevated temperatures, after appropriate soak time.

Figure 32A:
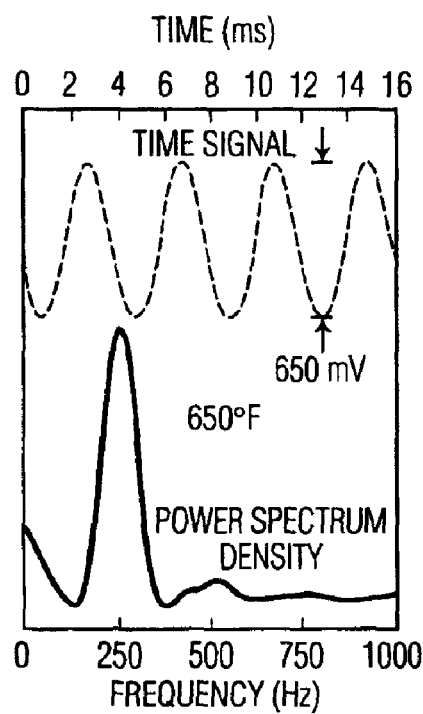
FIGS. 32A & B are graphs of transducer response at 650° F. subject to sinewave excitation.
Figure 32B:
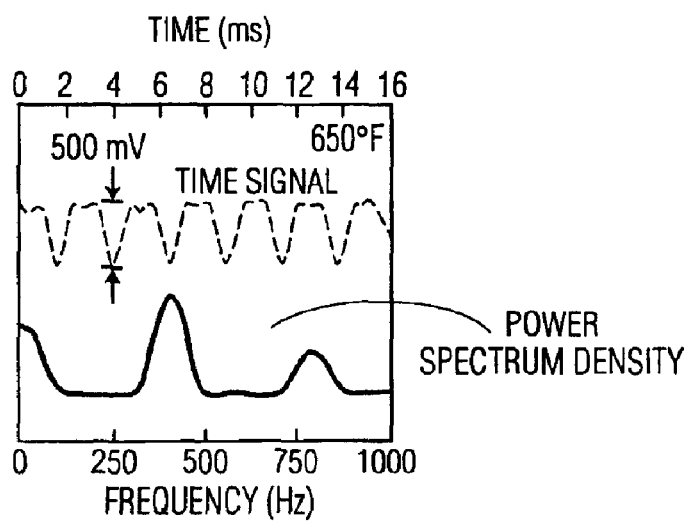

An example of the transducer response at 650° F. subject to a nominally 250 Hz sinewave excitation is shown in FIGS. 32A & B. The amplifier gain is 200. At the higher frequency of 400 Hz, the wave form is less sinusoidal due to resonance in the flow system. The second harmonic response is clearly visible at 800 Hz. These tests are greatly constrained by the limitations of the excitation mechanism and so do not fairly illustrate the frequency response capabilities of the sensor, which is many tens of kilohertz. The data do however, demonstrate nearly ideal ac response through the range of interest for many gas turbine active control applications.

The latest generation of dielectric isolated sensors have been fabricated and evaluated which employ the Kulite leadless design. The key features of the leadless design are the elimination (of the gold bonding and gold lead wires) and the hermetic sealing of the pressure capsule and the transducer assembly which will enable these transducers to operate in the most hostile environments.

Through experimentation a sensor of the type suitable for use in the combustion engine of a jet aircraft has been found to be a model nos. XTEH-7L and XTEH-10A pressure transducers manufactured by Kulite Semiconductor Corp. of Leonia, N.J. The features of these type of pressure transducers include fabrication for high temperature and high pressure operating environments vibration compensating features to distinguish false pressure variation measurements caused by vibration from actual air flow vibrations as well as a leadless installation in which the transducer can be directly welded to leads that connect to the control law device to thereby prevent open circuit conditions caused by vibrations acting upon the solder contacts. The features of these transducers are fully disclosed in U.S. Pat. Nos. 5,286,671, 6,293,154, 6,272,929, 5,955,771, 6,327,911 and 6,363,792 all assigned to Kulite Semiconductor Corporation and all of which are incorporated herein by reference. To establish the feasibility of these high pressure and high temperature pressure transducers for use in a jet aircraft combustion engine experiments were conducted on the Kulite XTEH-7L to judge whether it can be used in the actually operating environment of a combustion aircraft engine. The results of the experiments are detailed below as follows:

Experimental Assessment for Gas Turbine Testing

Introduction

An uncooled Kulite XTEH-7L high temperature pressure transducer was tested mounted on the combustor of a Rolls-Royce (Allison) S250-C30 turboshaft gas turbine engine to demonstrate transducer dynamic behavior in a realistic engine environment. A low temperature transducer (XCQ-062) in a water-cooled casing was mounted in parallel as a reference. At all temperatures tested (up to 700° F.), the high temperature transducer dynamic response was very similar to that of the low temperature unit.

Installation

A Rolls-Royce 5250-C30 engine (FIG. 33) was set up for experiments exploring the active control of surge. To raise the compressor operating line and facilitate surge studies, the engine can be equipped with flow blockages between the compressor discharge and combustor entrance (which requires minor engine disassembly for modification). In addition, de-ionized water can be injected into the compressor discharge to further raise the operating line in a controlled manner during an experiment while keeping the turbine entry temperature within allowable limits. Dynamic fluid forcing of the engine and feedback control is implemented with compressed air inbleed through the boundary layer suction slot around the compressor inducer. The bleed is at the compressor diffuser discharge pressure but is supplied by laboratory compressors in these experiments. A high frequency control valve powered by a Moog actuator modulates this flow at large amplitude up to a frequency of 400 Hz.

Figure 33:
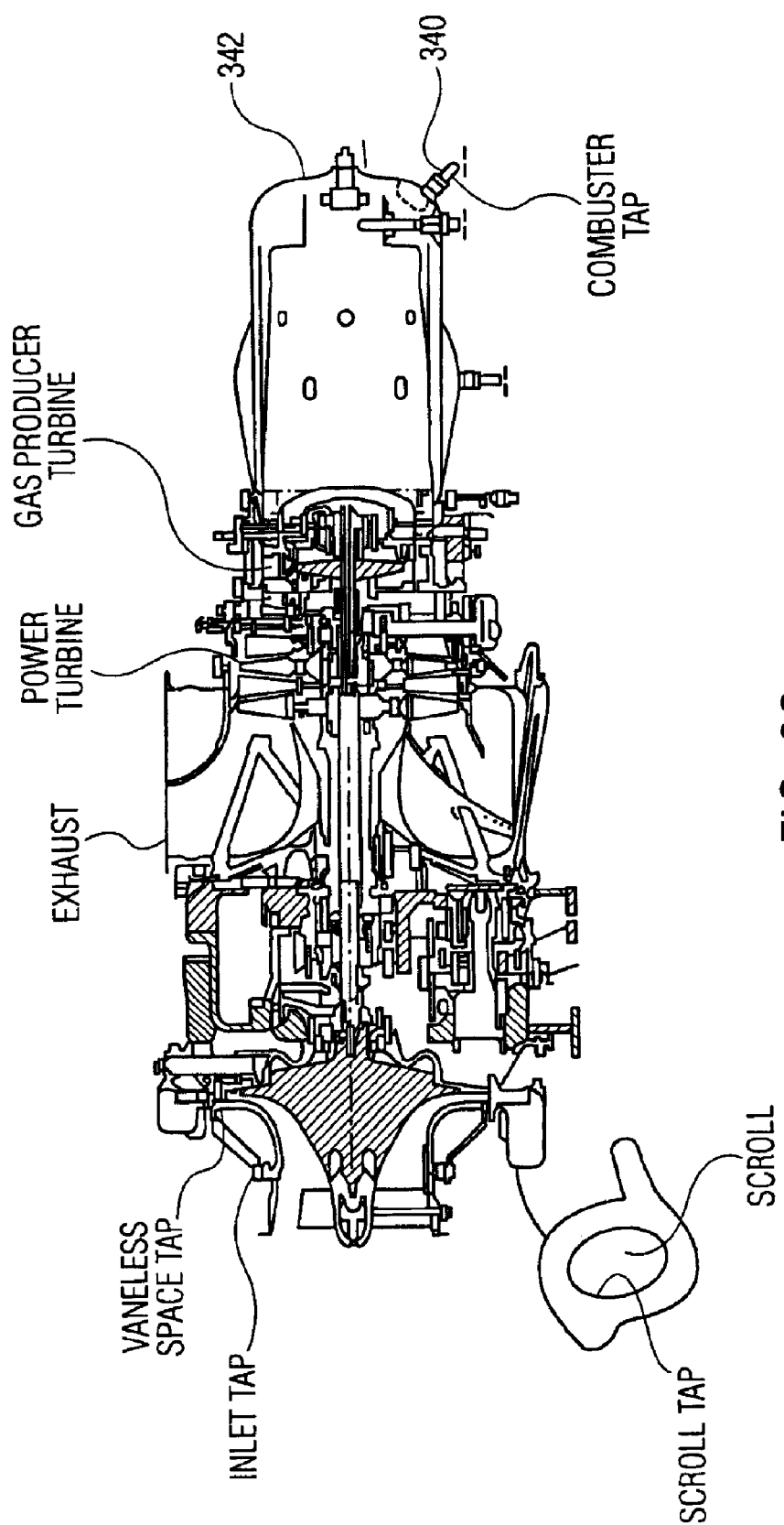
FIG. 33 is a diagram of a test engine.

Dynamic and static measurements within the engine are accomplished with arrays of Kulite low temperature XCQ transducers 340 mounted upstream, along the compressor flow path, and in the combustor 342 as shown in FIG. 33. Since the frequencies of interest for surge are less than 1 kHz, the transducers are mounted on 0.020" (0.5 mm) diameter SS tubing stubs less than 10" (12 cm) long. The transducers are mounted in low internal volume, water-cooled housings for thermal stability and long-term protection in the hot engine environment.

Figure 34:
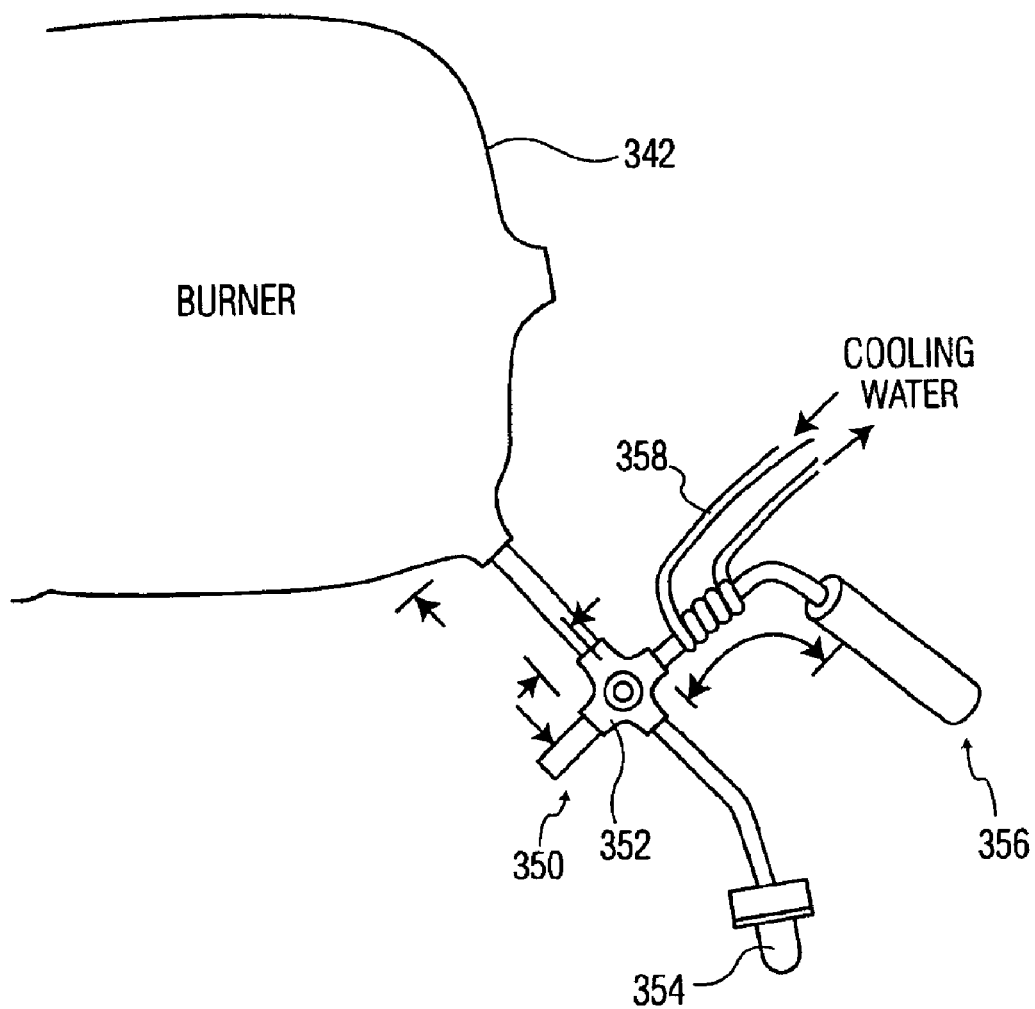
FIG. 34 is a diagram of a pressure transducer operational test configuration.

With reference to FIG. 34, the Kulite XTEH-7L-190-100A high temperature pressure transducer 350 is mounted on a ¼" tubing T fitting 352 attached to a combustor drain plug 354. On one side of the T fitting 352 is a reference Kulite XCQ-062-250G pressure transducer 356 in a water-cooled housing 358. The XTEH-7L pressure transducer 350 is mounted to the other leg of the fitting. Because the ambient temperature is low in the laboratory environment, unlike a typical aircraft installation, an electric heater (not shown) has been attached to the tubing fitting and the XTEH-7L insulated to achieve temperatures more typical of installation in an advanced large engine. A thermocouple monitors the transducer temperature.

The data system for the transducer consists of Pacific Scientific instrumentation amplifiers feeding a 16-bit A/D system. Excitation voltage was 15 V for both transducers. The analog signal is unfiltered, and the sampling rate used was between 5 and 20 kHz (see individual plots).

Data and Discussion

Tests were performed at various temperatures between 250° F. and 700° F., at both idle and high power operating conditions (see FIGS. 35–42). Mean pressures ranged from 20 to 90 psi, while perturbations were between 2 and 10 psi peak to peak. Broadband combustion noise was recorded, with several spectral peaks between 0 and 5000 Hz. Although there were slight differences in the spectral content of the two transducers, their signals were overall quite similar. In fact, the gain from the XCQ transducer was used to reduce the XTEH data, as a surrogate for an in site calibration. Offsets were chosen so that the mean values of the traces are identical in the plots shown here.

Figure 35:
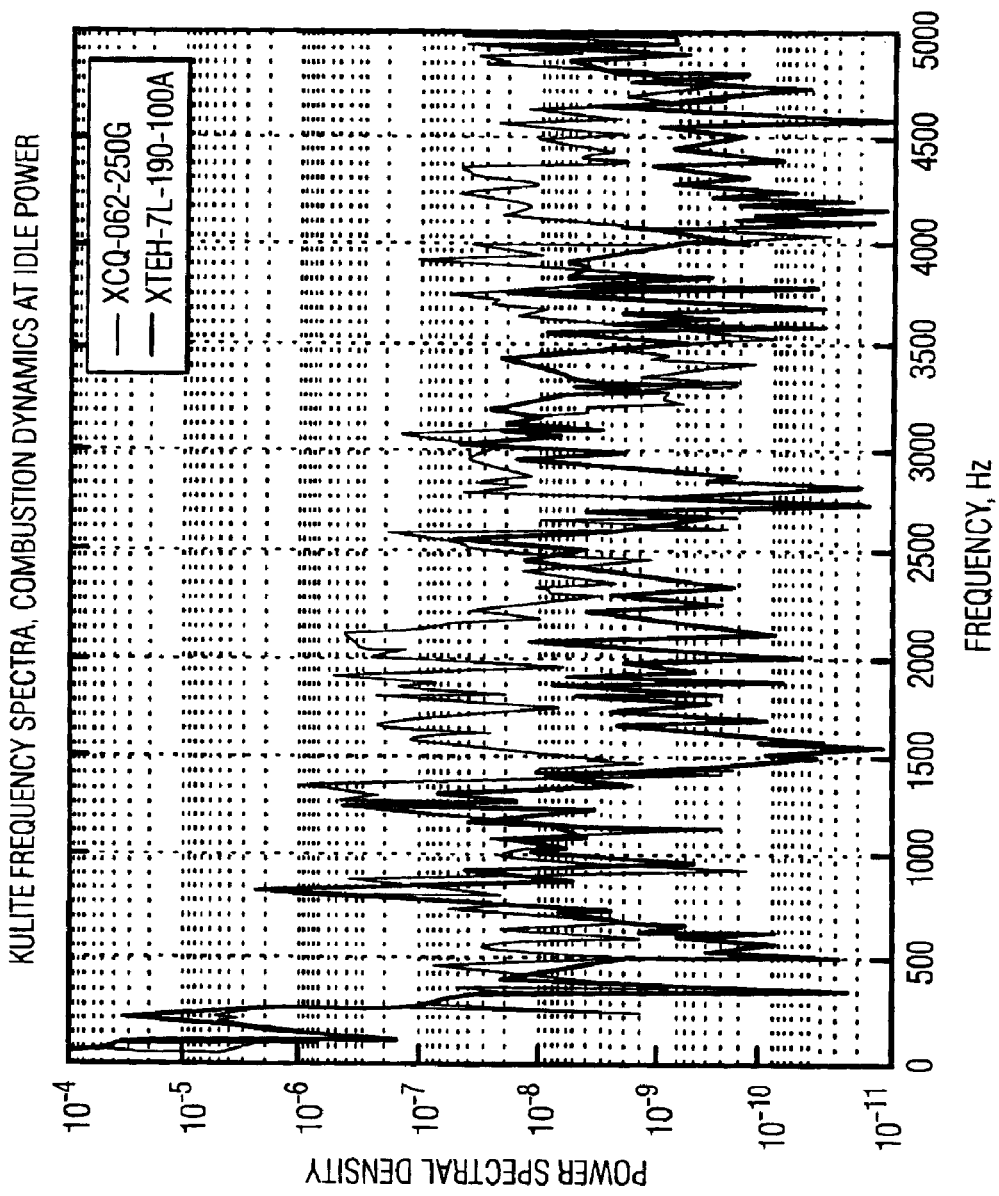
FIG. 35 is a graph of a spectrum analyzer output at idle.
Figure 36:
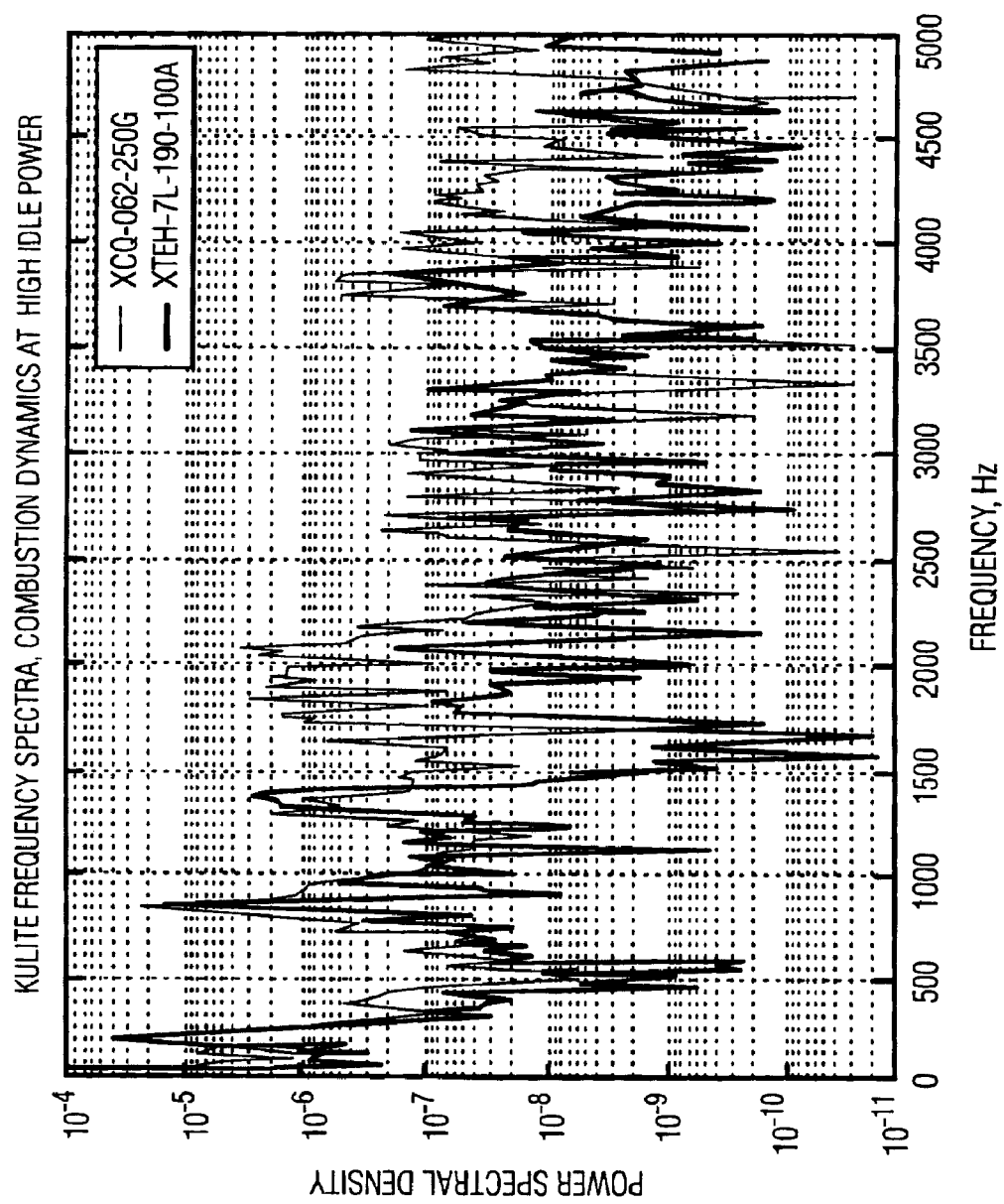
FIG. 36 is a graph of a spectrum analyzer output at high power.
Figure 37:
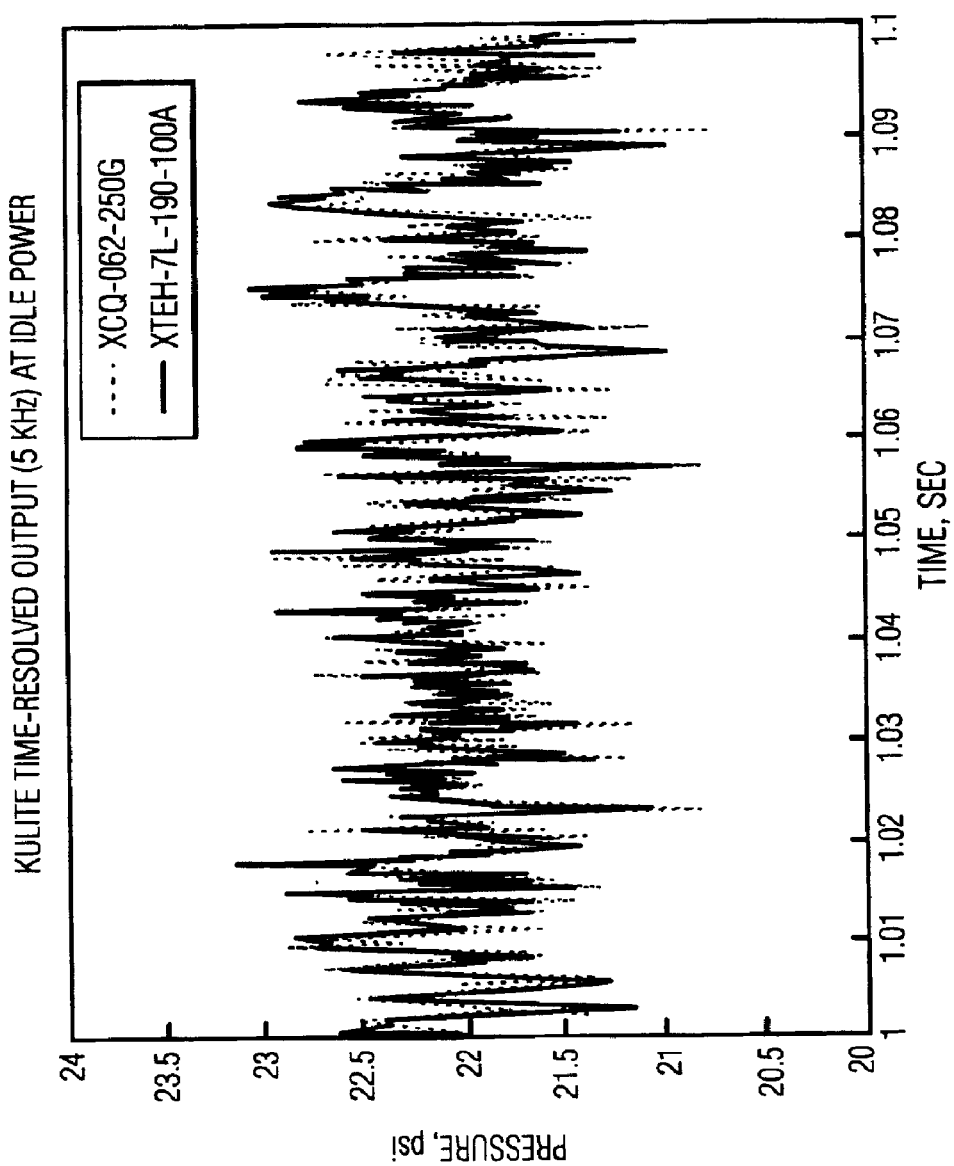
FIGS. 37–40 are comparative graphs of test data acquired at various power settings and temperatures.
Figure 38:
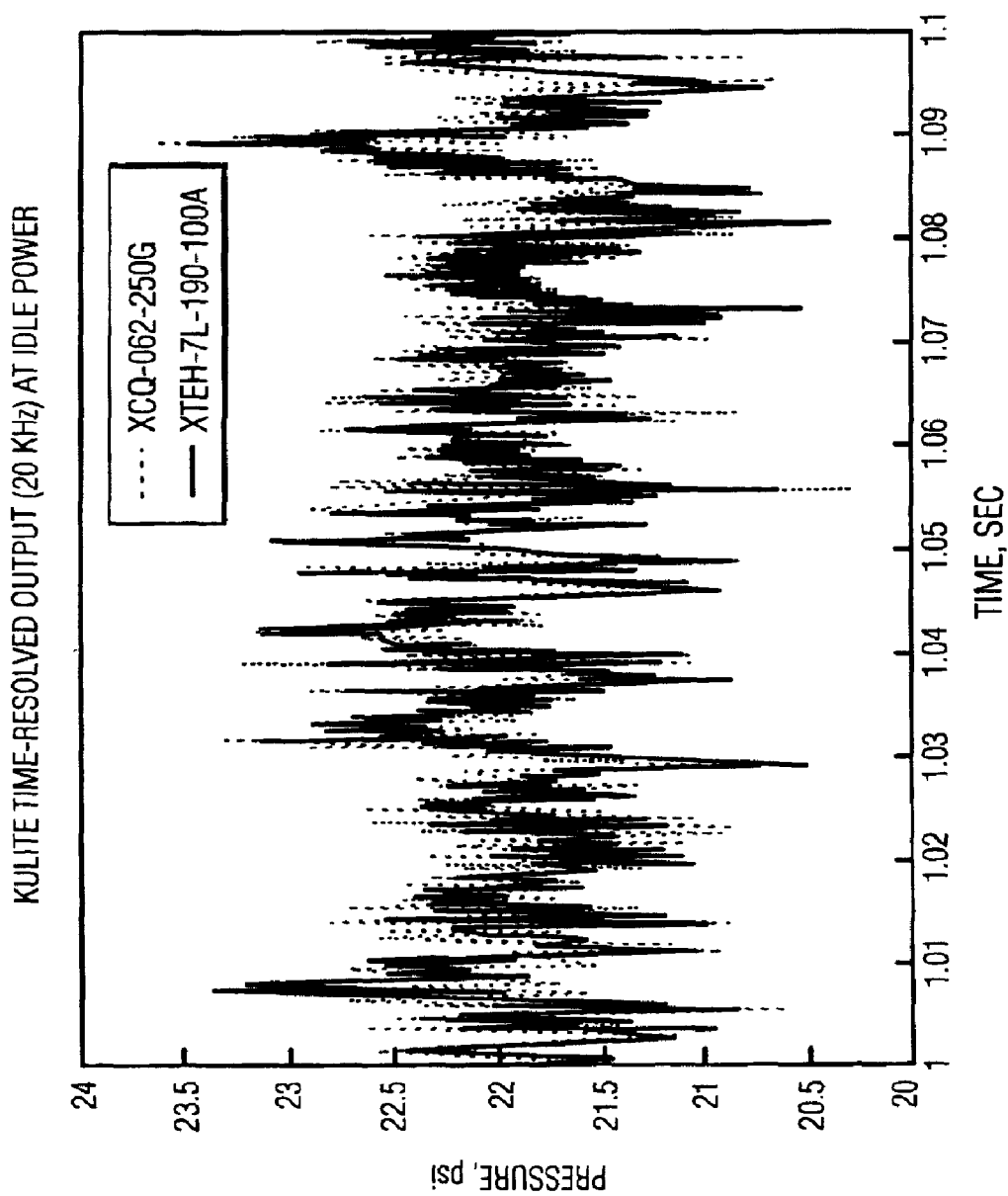
Figure 39:
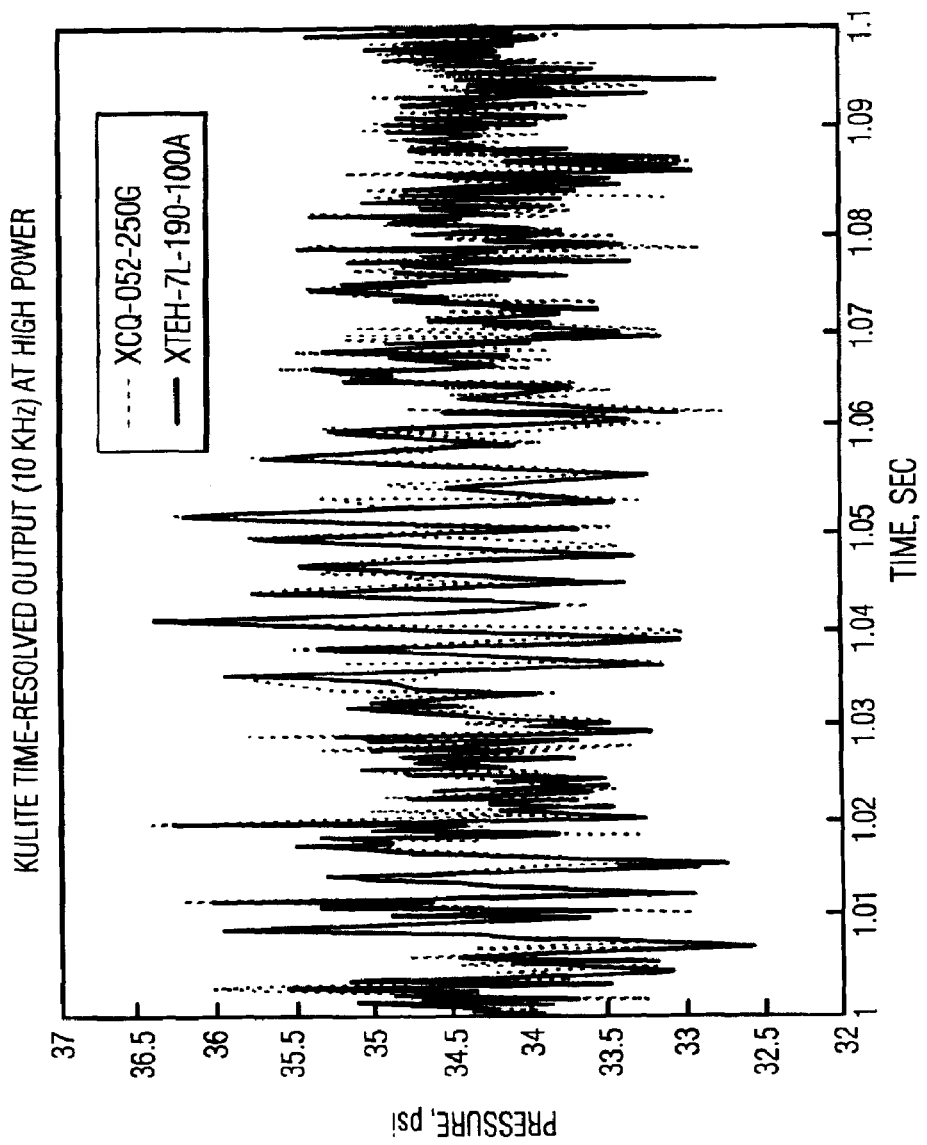
Figure 40:
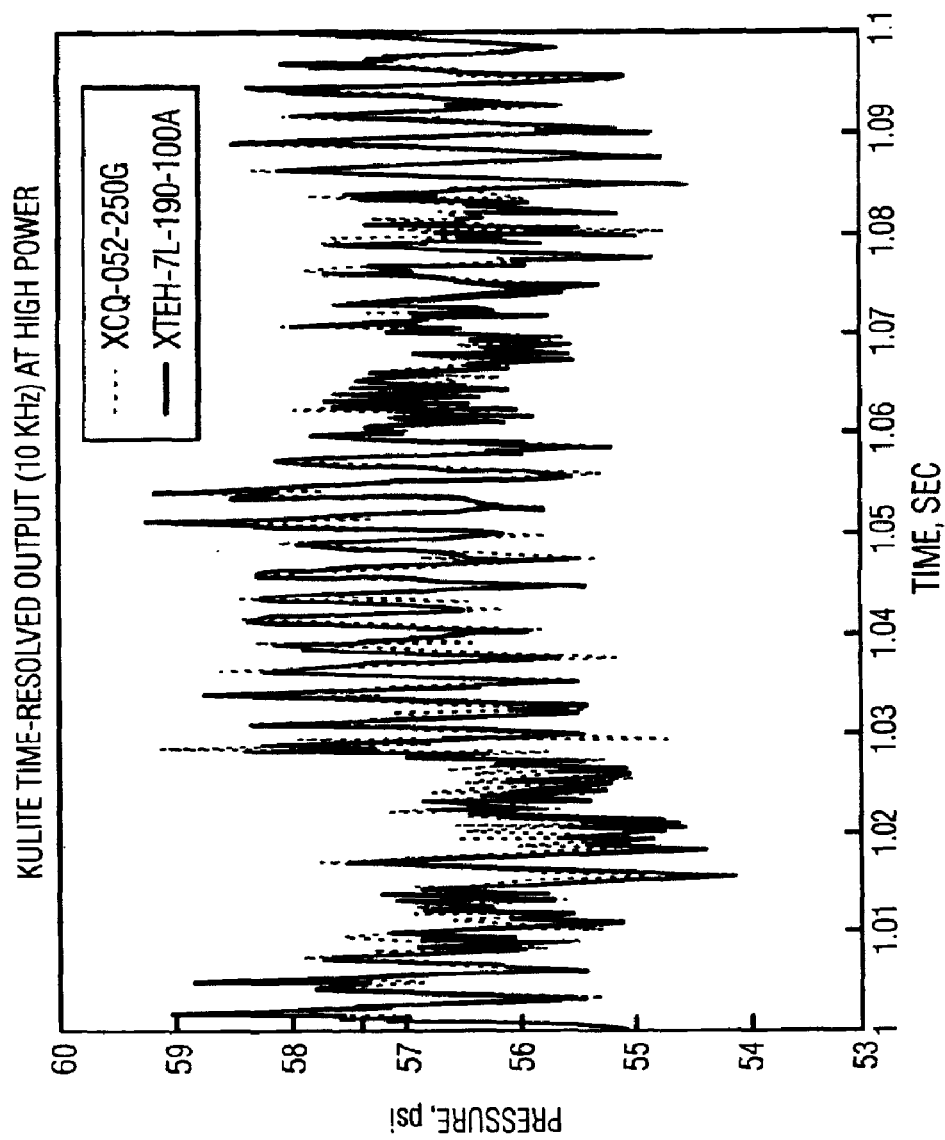

Two data acquisition methods were applied. The first was simply to use a spectrum analyzer with storage capability. FIGS. 35 and 36 show the output of the spectrum analyzer for 2 different conditions—idle power (20 psi mean) at 700° F., and high power (56 psi mean) at 500° F. The two primary spectral peaks below 1000 Hz are captured by both transducers, as are secondary spectral peaks between 1 kHz and 5 kHz. In the region between 1500–2000 Hz there are differences between these plots. Although the signal power in this frequency range is 2 to 3 orders of magnitude lower than the peak values, it is believed that this discrepancy is due to acoustic effects in the longer lines leading to the XCQ transducer (signal power is larger for the XCQ transducer in this range).

Figure 41:
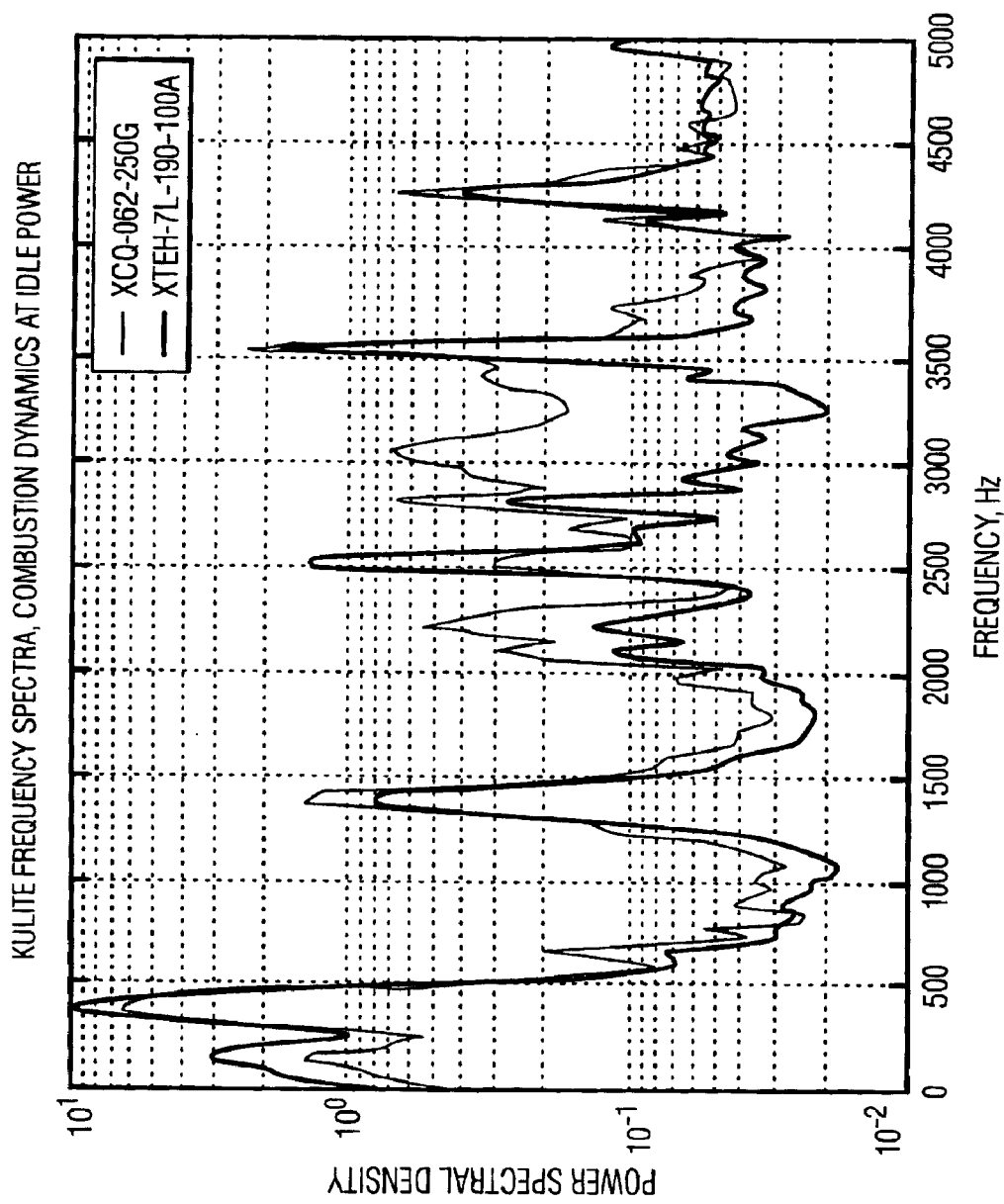
FIG. 41 is a graph of power spectral density by frequency computed from the data illustrated in FIGS. 37–40.
Figure 42A:
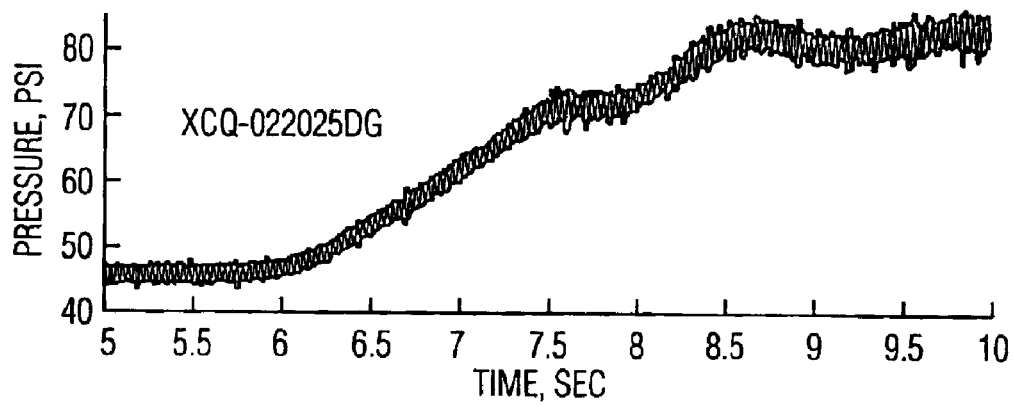
FIGS. 42A and B are graphs of signals during load transients.
Figure 42B:
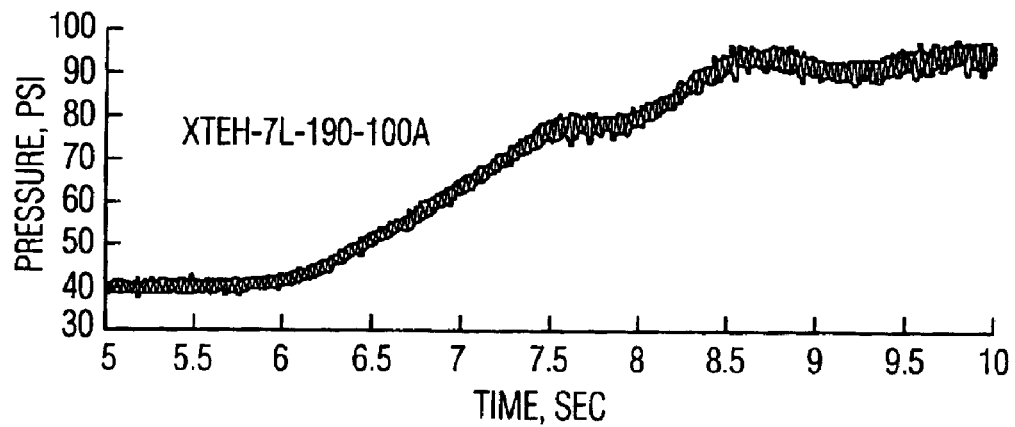

The second data acquisition method was an 8-channel DSP-base data acquisition system sampling between 5 and 20 kHz. FIGS. 37 through 40 compare raw traces from this data acquisition system for various power settings and temperatures. These traces also show very similar features, with the traces overlaying one another in each case. Spectra can also be computed from this data; an example is shown in FIG. 41. Finally, in FIG. 42A and B, a power transient is recorded and a side-by-side comparison of the two transducers is shown. Note that the XCQ calibration is not exactly right over the full range of the transducer, but that both transducers basically measure the entire transient in a similar way.

Kulite XTEH Transducer Tests on a Gas Turbine Jet Engine

Introduction

Two uncooled Kulite XTEH type high temperature pressure transducer (XTEH-7L-190-200A and XTEH-10AC-190-200A) were tested mounted on the combustor of a Rolls-Royce (Allison) S250-C30 turboshaft gas turbine engine to demonstrate transducer dynamic behavior in a realistic engine environment (FIG. 33). A low temperature transducer (XCQ-062-250G) in a water-cooled casing was mounted in parallel as a reference. The XTEH 7L transducer was tested up to 700 deg F, and the XTEH-10AC transducer was tested up to 900 deg F.

Installation

A highly instrumented Rolls-Royce 5250-C30 engine was used for the tests described here. Static and dynamic measurements within the engine are accomplished with arrays of Kulite low temperature XCQ transducers mounted upstream, along the compressor flow path, and in the combustor. Since typical frequencies of interest in engine dynamics are less than 1 kHz, the transducer are mounted on 0.020" (0.5 mm) diameter stainless steel tubing stubs that are less than 10" (12 cm) long. The transducers are mounted in low internal volume, water-cooled housings for thermal stability and long-term protection in the hot engine environment.

The Kulite high temperature pressure transducers were mounted on a ¼" tubing T fitting attached to a combustor drain plug. On one side of the T fitting is a reference XCQ-062-250G pressure transducer in a water-cooled housing similar to the configuration of FIG. 34. The XTEH pressure transducers were mounted to the other leg of the fitting. Separate tests were conducted with the XTEH-7L and the XTEH-10AC mounted in the same fitting. Because, unlike a typical aircraft installation, the ambient temperature is low in the laboratory environment, an electric heater has been attached to the tubing and the XTEH-7L insulated to achieve temperatures more typical of installation in an advanced large engine. A thermocouple monitors the transducer temperature.

The data system for the transducer of Pacific Scientific instrumentation amplifiers feeding a 16 bit A/D system. Excitation voltage was 15 V for both transducers. The analog signal is unfiltered, and the sampling rate used was 5 kHz.

Two engine runs were conducted (one for each transducer). The only difference between the runs was that the maximum temperature tested for the XTEH-7L transducer was 700 deg F., and the maximum temperature for the 10AC transducer was set at 900 deg F. Both runs consisted of first running engine at idle, taking unsteady data with the Kulites heated to 500 F. This was then followed by a spool-up to max throttle, which causes the spool speed to accelerate to 70%, and recording the transient. The engine was then tested at various speeds (between 70% and 90%) and various transducer temperatures. Since heating of the transducers was not controlled, and engine run time was limited, temperature of the probe varied by as much as 5 deg F. during the sample intervals; this was more pronounced during XTEH-10AC testing due to the large temperature change that was induced by heating. During XTEH-7L testing, the rate of temperature increase was never greater than 0.5 deg/sec.

Calibration

Figure 43A:
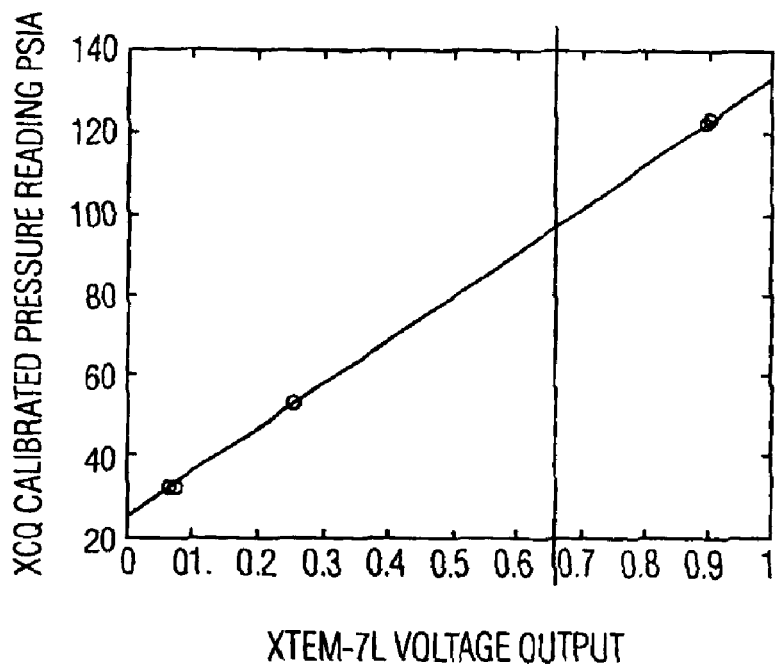
FIGS. 43A and B are graphs of transducer calibrations.
Figure 43B:
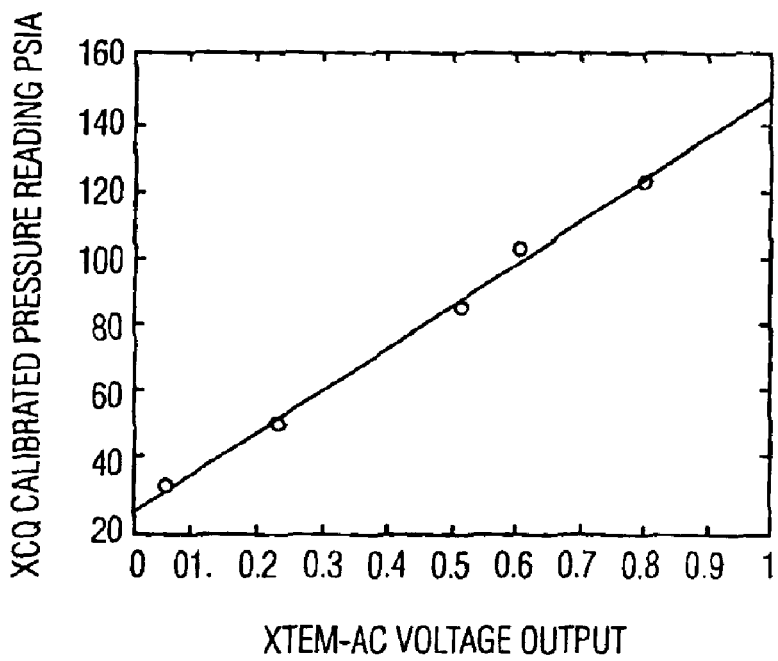

Since the water-cooled reference transducer was a differential transducer, calibration using a vacuum pump on the back side of the transducer was performed. This calibration was subject to two sources of inaccuracy: the calibration range was 0 to 14 psia while the operating range was up to 125 psia, and the vacuum line was leaky, so that the minimum pressure in the calibration was not very accurate. Thus the XCQ calibration was relatively poor. To allow comparison of the transducer signals, however, this transducer was then taken as the reference transducer, and data taken during the engine run (at various temperatures and combustor pressures) was used to drive calibration constants for the XTEH transducers. The resulting calibration curves for the XTEH transducers are shown in FIGS. 43A and B.

Test Results

Figure 44A:
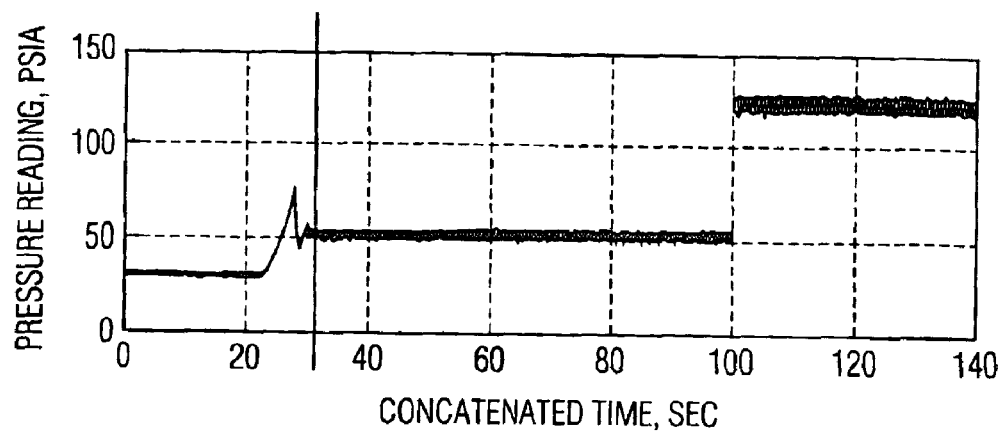
FIGS. 44A and B are graphs of pressure and temperature during a first test.

Using these pseudo-calibrations to make the transducer outputs comparable, a summary of the runs can be made. By plotting each 10-second transient in sequence, FIGS. 44A and B and 45A and B show a sequential history of the pressure outputs and the temperatures tested. Note that there are gaps of several minutes between each data set, so that the entire run is not really as short as the sequence shown; concatenation of the time histories is asynchronous with the actual measurements. Both transducers track the cooled transducer outputs well up to 700 or 800 deg F.; however, at the highest temperatures tested the 10AC transducer failed.

Figure 44B:
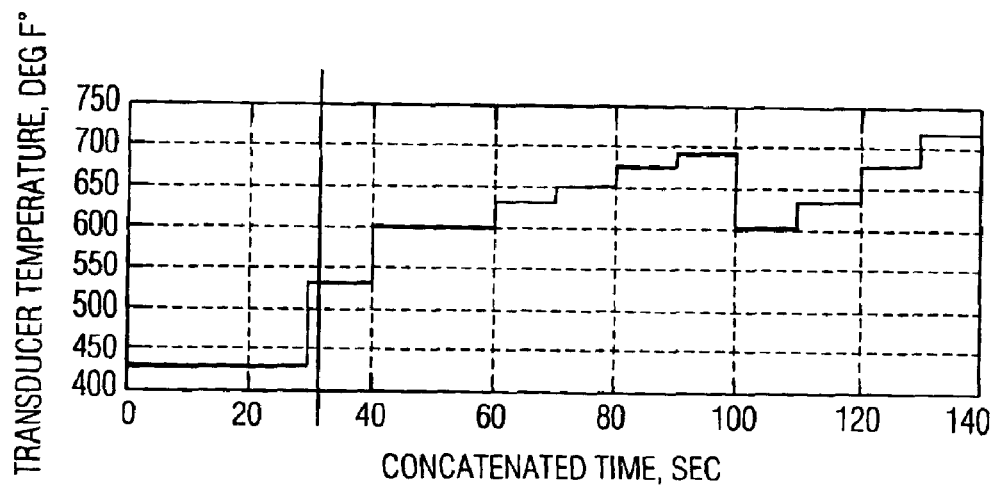
Figure 45A:
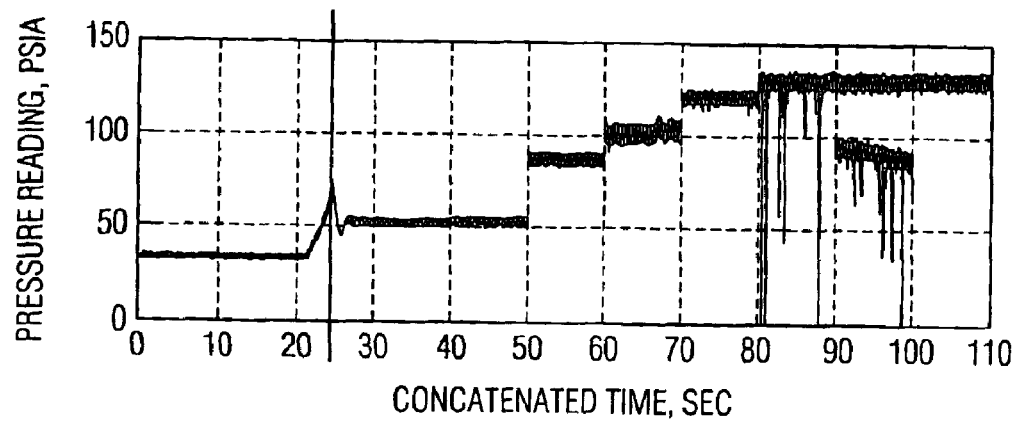
FIGS. 45A and B are graphs of pressure and temperature during a second test.
Figure 45B:
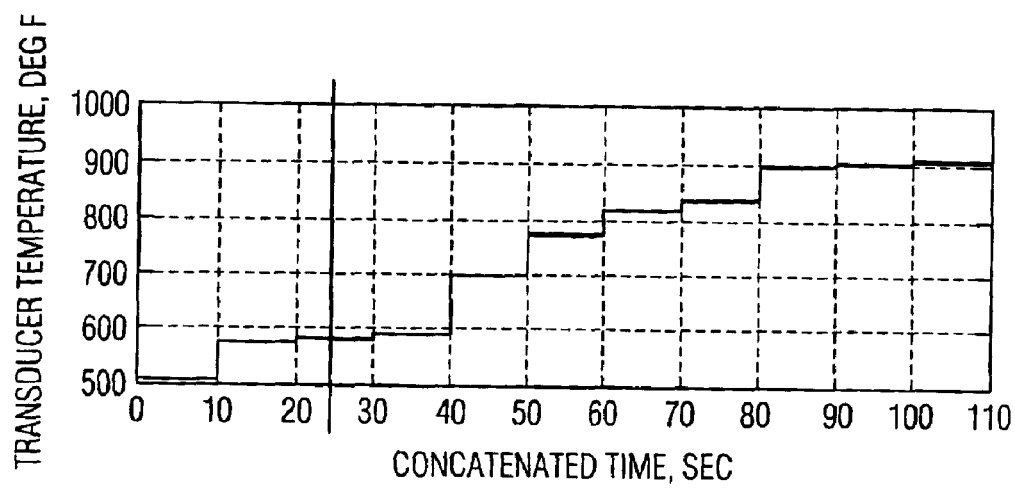
Figure 46:
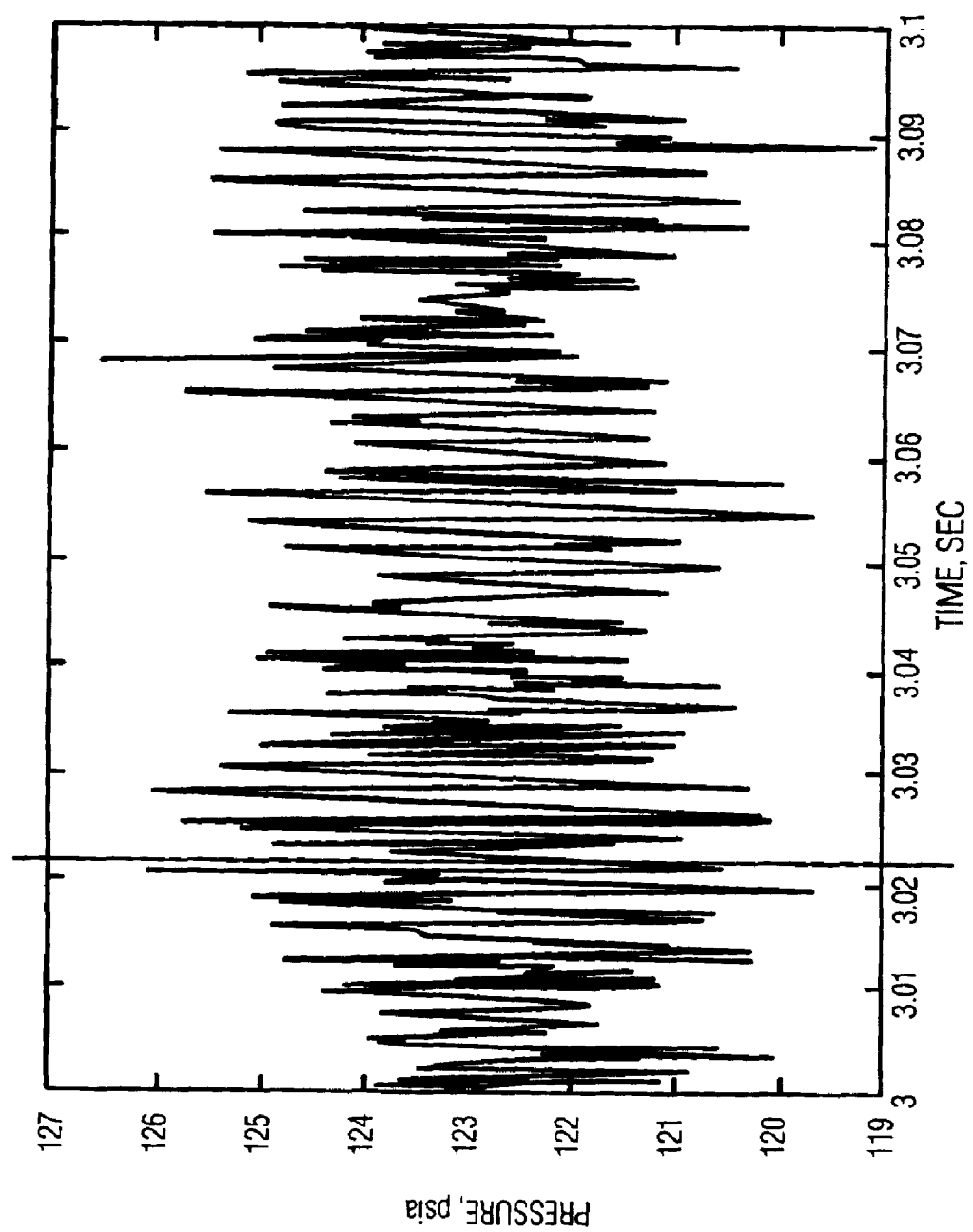
FIG. 46 is a graph of test data acquired at various power settings during the first test of FIG. 44.
Figure 47:
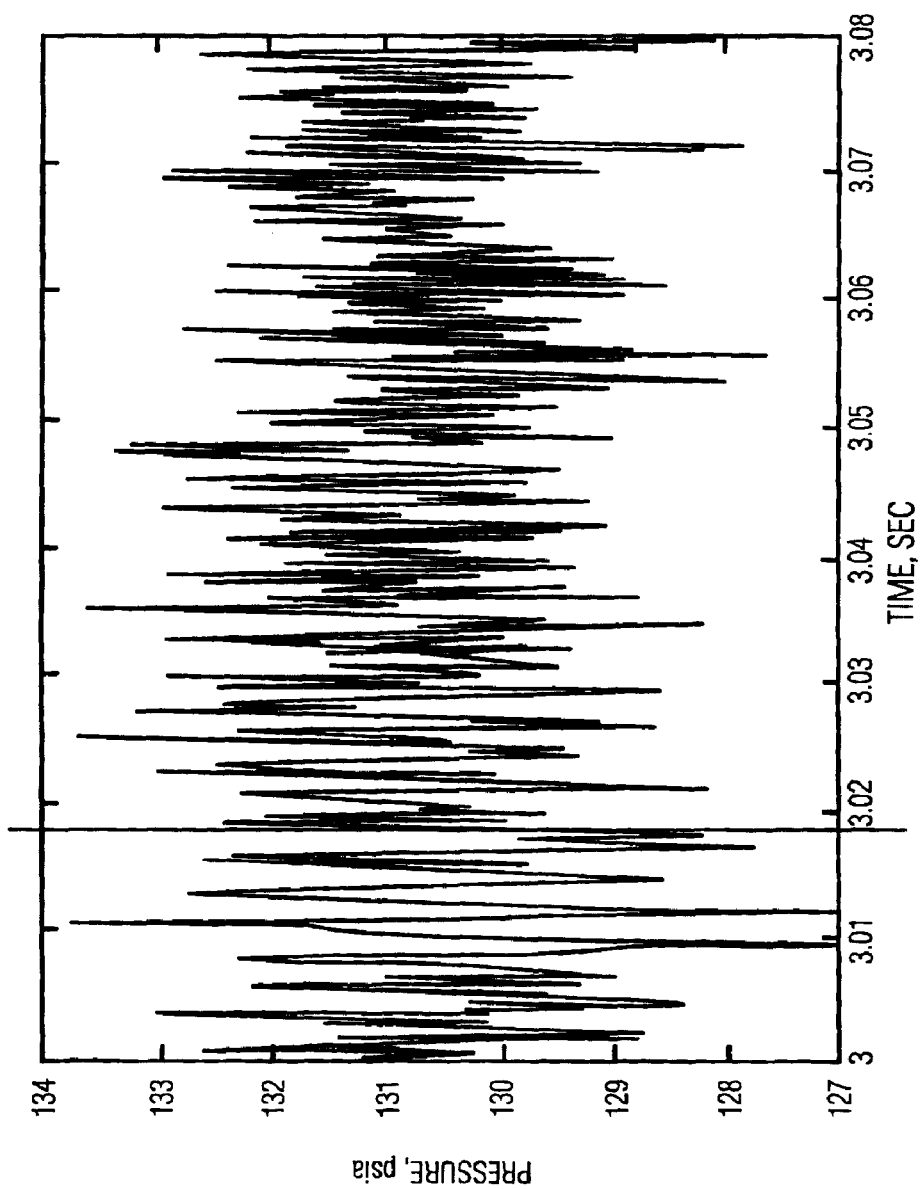
FIG. 47 is a graph of test data acquired at various power settings during the first test of FIG. 45.
Figure 48:
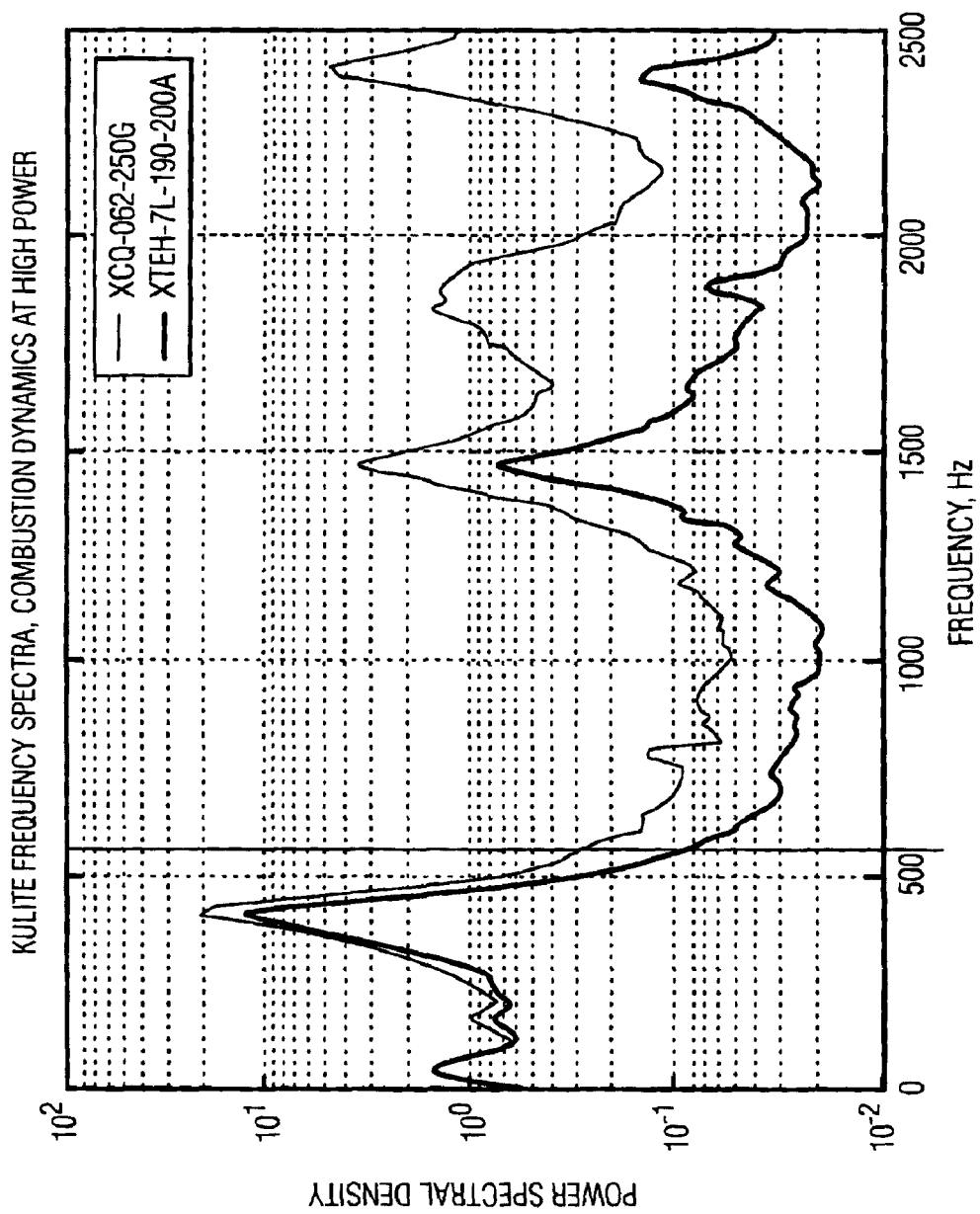
FIG. 48 is a graph of power spectral density by frequency computed from the data illustrated in FIG. 44.
Figure 49:
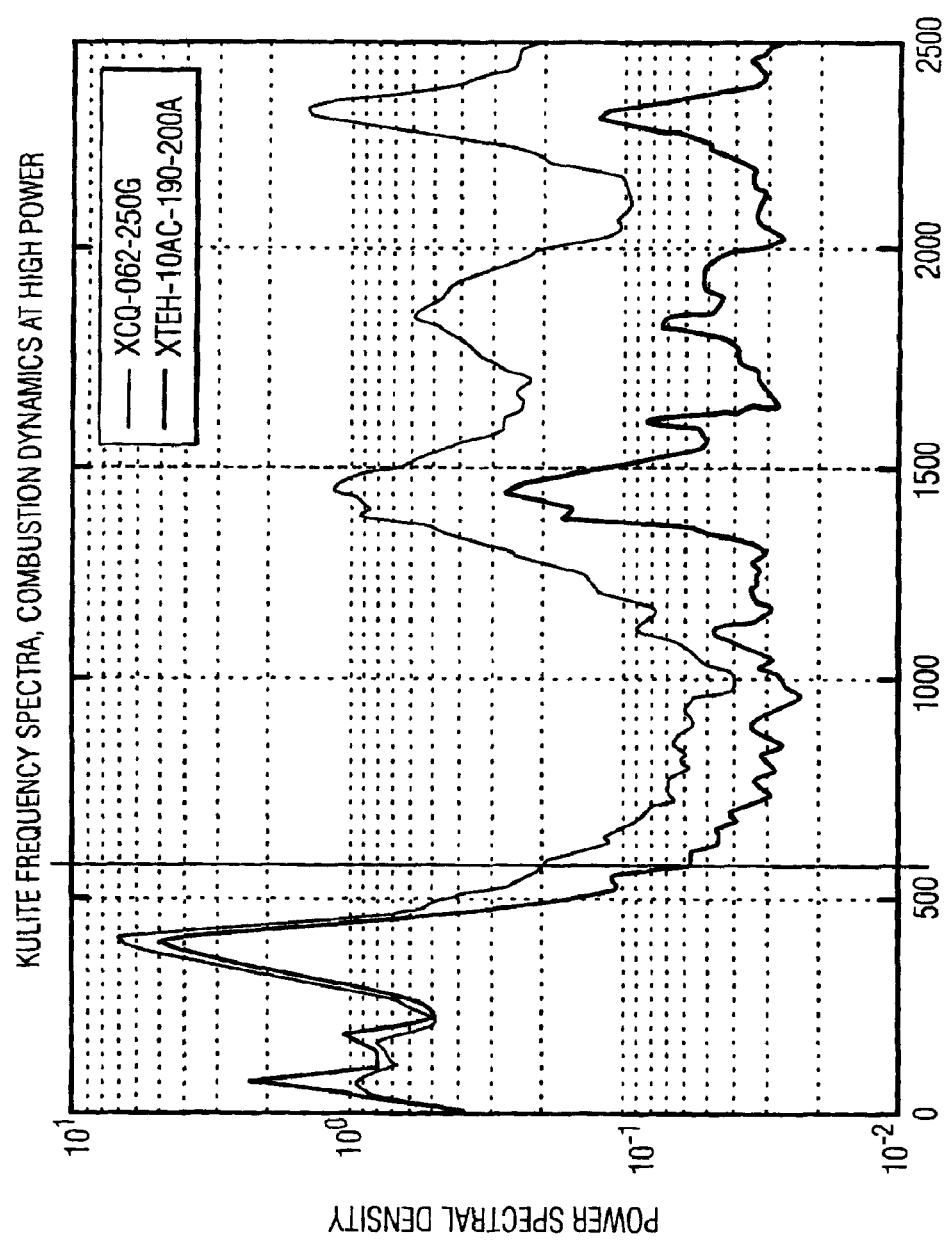
FIG. 49 is a graph of power spectral density by frequency computed from the data illustrated in FIG. 45.

It is apparent in the FIGS. 44 and 45 that both transducers track the low frequency transients and oscillations in the same way. To look at higher frequency oscillations, very short sequences of data are plotted in FIGS. 46 and 47. Finally, spectral analysis of the data was performed; the results for typical data sets are shown in FIGS. 48 and 49. In general, the high temperature transducers appear to have a lower noise floor, allowing them to resolve frequency peaks more distinctly.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A turbo-jet engine with active compensation for aerodynamic instabilities comprising:
  a compressor having at least one compression section, a combustion chamber adapted to receive air from said at least one compression section and a turbine section coupled to said combustion chamber to receive said pressurized and heated air;
  a plurality of pressure transducers placed about a peripheral wall of said at least one compression section;
  said pressure transducers each having a wafer having piezoresistive regions fusion bonded to an insulating layer of a carrier wafer, said carrier wafer being etched to form a diaphragm and each of said pressure transducers being placed about the circumference to collectively measure aerodynamic excitation frequencies;
  a plurality of actuators adapted to adjust air flow in said at least one compression section and fuel flow in said combustion chamber;
  a processor located remotely from said engine and in signal communication with said actuators and said pressure transducers and adapted by software having routines to:
    measure pressure fluctuations in said at least one compression section;
    associate measured pressure fluctuations with aerodynamic excitation frequencies associated with an aerodynamic instability; and
    upon associating a measured pressure fluctuation with an aerodynamic instability, signal said actuators to adjust engine operation to minimize the occurrence of said aerodynamic instability;
  wherein said processor controls said actuators to compensate for said aerodynamic instabilities.

2. The engine of claim 1 wherein said pressure transducers further include means for vibration compensation.

3. The engine of claim 1 wherein said insulating layer is formed by oxidation.

4. The engine of claim 1 wherein pressure transducers are welded to said wall and signal communication between said processor and said pressure transducers includes electrical leads welded to said pressure transducers.

5. The engine of claim 1 wherein said pressure transducers placed along the peripheral wall of a compression section selected from the group consisting of an intermediate compression section and a high compression section.

6. The engine of claim 1 wherein said pressure transducers are arranged in spaced apart relation about said peripheral wall to optimize measurement of aerodynamic excitation frequencies in said chamber.

7. The engine of claim 1 wherein said associate routine applies control laws defined by Fourier transforms that approximate aerodynamic instabilities.

8. A stabilized jet engine comprising:
  a turbo-fan, gas turbine engine having compression sections, a combustion chamber and turbine sections;
  a plurality of pressure transducers disposed about an outer perimeter of an intermediate compression section, a high compression section or both the intermediate and high compression sections adapted to measure changes in air pressure;
  at least one actuator connected to a valve selected from the group consisting of a bleed valve and a fuel injector valve;
  a control law device, located remotely from said gas turbine engine while in signal communication with said pressure transducers and said at least one actuator, under the control of software to receive and record pressure measurements from said pressure transducers and detect air pressure changes indicative of a surge condition, rotational stall condition or both and, in response to detecting such a condition, signaling said at least one actuator to adjust said valve to thereby avoid such a condition;
  an electric circuit for providing signal communication between said pressure transducers and said control law device; and
  said pressure transducers being mounted flush with said outer perimeter and welded to said electric circuit and adapted to withstand high temperature and high pressure conditions, said pressure transducers further including a vibration compensating circuit;

wherein said pressure transducers are adapted to conform to the environmental operating conditions of a jet engine without the need for additional environmental compensating equipment to withstand the high temperatures and high vibrational conditions experienced in a commercial jet aircraft.

* * * * *